US009112797B2

United States Patent
Ludwig et al.

(10) Patent No.: US 9,112,797 B2
(45) Date of Patent: Aug. 18, 2015

(54) CONGESTION HANDLING IN A COMMUNICATION NETWORK

(75) Inventors: Reiner Ludwig, Hürtgenwald (DE); Henning Wiemann, Aachen (DE)

(73) Assignee: TELEFONAKTIEBOLAGET L M ERICSSON (PUBL), Stockholm (SE)

(*) Notice: Subject to any disclaimer, the term of this patent is extended or adjusted under 35 U.S.C. 154(b) by 130 days.

(21) Appl. No.: 13/636,356

(22) PCT Filed: Mar. 31, 2010

(86) PCT No.: PCT/EP2010/054380
§ 371 (c)(1),
(2), (4) Date: Sep. 21, 2012

(87) PCT Pub. No.: WO2011/120581
PCT Pub. Date: Oct. 6, 2011

(65) Prior Publication Data
US 2013/0010598 A1    Jan. 10, 2013

(51) Int. Cl.
*H04L 12/825* (2013.01)
*H04L 12/801* (2013.01)

(52) U.S. Cl.
CPC .............. *H04L 47/26* (2013.01); *H04L 47/10* (2013.01); *H04L 47/14* (2013.01)

(58) Field of Classification Search
None
See application file for complete search history.

(56) References Cited

U.S. PATENT DOCUMENTS

| 5,917,806 A * | 6/1999 | Lin et al. ................. 370/237 |
| 2004/0071086 A1* | 4/2004 | Haumont et al. ......... 370/230 |
| 2007/0076690 A1 | 4/2007 | Dyck et al. |
| 2007/0127378 A1* | 6/2007 | Yang et al. .............. 370/235 |

FOREIGN PATENT DOCUMENTS

| JP | 2008236770 A | 10/2008 | |
| JP | 2009512254 A | 3/2009 | |
| WO | 2006075951 A1 | 7/2006 | |
| WO | 2008066429 A1 | 6/2008 | |
| WO | WO 2008/066427 * | 6/2008 | .............. H04L 12/56 |

* cited by examiner

*Primary Examiner* — Wei Zhao
*Assistant Examiner* — Ronald H Davis
(74) *Attorney, Agent, or Firm* — Coats & Bennett, PLLC

(57) ABSTRACT

Data packets of a flow associated with a first bearer and data packets of a flow associated with a second bearer are received in an intermediate node (140). The data packets are then transmitted from the intermediate node (140). in response to a congestion being detected on the first bearer, one of the first bearer and the second bearer is selected for notification of the congestion in the associated flow. The selection may be based on a type of the congestion, e.g. the detected congestion being in a transport network (160) or the congestion being on a radio link (250).

17 Claims, 10 Drawing Sheets

CONGESTION HANDLING IN A COMMUNICATION NETWORK

TECHNICAL FIELD

The present invention relates to techniques of handling congestions in a communication network.

BACKGROUND

In mobile communication networks according to the 3GPP (Third Generation Partnership Project) technical specifications, intermediate transport networks may be used to convey data between different nodes of the mobile communication network. One example of such a scenario occurs when using a technology referred to as High Speed Packet Access (HSPA). Here, a transport network, also referred to as Iub transport network, may be used in the UMTS Terrestrial Radio Access Network (UTRAN, UMTS: Universal Mobile Telecommunications System) to couple a Radio Network Controller (RNC) to a radio access node (also referred to as Radio Base Station or NodeB). HSPA in the direction from the mobile communication network to a user equipment (UE) is also referred to as High Speed Downlink Packet Access (HSDPA), and HSPA in the direction from the UE to the mobile communication network is also referred to as High Speed Uplink Packet Access (HSUPA). The main aspects of HSPA are specified in the 25 series of the 3GPP technical specifications (e.g. the 3GPP technical specification 25.308).

According to HSPA, two levels of link layer retransmission protocols are used: Hybrid Automatic Repeat Request (HARQ) between the UE and the NodeB, and Radio Link Control (RLC) between the UE and the Radio Network Controller (RNC). A flow control protocol, also referred to as Framing Protocol (FP), has been introduced to control the sending rate of the RNC in the downlink direction and the sending rate of the NodeB in the uplink direction. The FP needs to address congestions on the radio link between the NodeB the UE and congestions in the transport network between the NodeB and the RNC, and will try to set an optimal sending rate which is as high as possible while avoiding the above types of congestion. This means that the FP attempts to control the sending rate in such a way that the fill level of queues in subsequent nodes will not exceed a given size.

However, it has turned out that the above-mentioned optimal sending rate is typically hard to achieve using the known FP. This is in part due to the known FP being a rate-based flow control protocol. Further, typical scenarios of using HSPA involve, e.g., a rapidly changing radio capacity available to a certain RLC connection or different Iub transport network deployments with different RLC round trip delays. This may in result either in the sending rate being set too low or in congestions not being avoided. Both adversely affects end-to-end performance, e.g. measured in terms of throughput. Moreover, the known FP handles all RLC connections in the same manner. This may result in the end-to-end performance experienced by a high-priority service or user suffering from congestions in the Iub transport network which are caused by RLC connections related to another service or user. The FP in HSDPA may also be configured to target fair bandwidth sharing among users or the target bit rate may be coupled to a user class so that some users get e.g. twice as much throughput as other users. In order to achieve this behavior, the HSDPA FP entity in the NodeB scales the target bit rates for each flow or user so that they match the desired relative bit rates. However, this still does not solve the above-mentioned problems of adapting the sending rate.

Another example of such a scenario occurs when using a technology referred to as Long Term Evolution (LTE). Here the transport network spans from the LTE base station, also referred to as E-UTRAN NodeB (eNodeB) in the Evolved UMTS Terrestrial Radio Access Network (E-UTRAN) to the Serving Gateway (S-GW) which is part of the Evolved Packet Core (EPC). The main aspects of LTE are specified in the 36 series of the 3GPP technical specifications (e.g. in the 3GPP technical specification 36.300).

Unlike HSPA, LTE does not use a link layer retransmission protocol between the eNodeB and the S-GW. Furthermore, no flow control protocol has been specified between these nodes. Instead, any node detecting excessive queuing may drop packets and thereby enforce the end-to-end congestion control mechanism of the transport layer as provided by the Transmission Control Protocol (TCP) to reduce its congestion window. This results in a reduction of the amount of data the TCP sender injects into the system and consequently, it reduces the size of the queue.

The principle of end-to-end congestion control by means of Queue Management is well known and widely used in the Internet. It cannot be applied in the HSPA transport network due to the above-mentioned link layer retransmission protocol which would recover from all packet drops and thereby hide the congestion from the TCP protocol.

While end-to-end queue management is, when applicable, superior to flow control protocols in terms of efficiency, performance and complexity, it does not provide per-user fairness or relative fairness. This is in particular the case when the bottleneck occurs in any transport network switch or router between the eNodeB and the S-GW as these are not aware of users or desired relative bit rate shares.

Accordingly, there is a need for techniques which allow for efficiently handling congestions in a transport network.

SUMMARY

According to an embodiment of the invention, a method is provided which may be used for congestion handling in a communication network, e.g. in a mobile communication network implementing HSPA or LTE. According to this method data packets of a flow associated with a first bearer and data packets of a flow associated with a second bearer are received in an intermediate node. The data packets of the flow associated with the first bearer and the data packets of the flow associated with the second bearer are transmitted from the intermediate node. In response to a congestion being detected on the first bearer, at least one of the first bearer and the second bearer is selected for notification of the detected congestion in the associated flow.

According to a further embodiment of the invention, a method is provided which may be used for congestion handling in a radio access node of a communication network implementing HSDPA. According to this method, data packets are received from a transport network and transmitted on a radio link. A congestion on the radio link or in the transport network is detected. In response to the detected congestion being on the radio link, a first type of congestion message is generated. In response to the detected congestion being in the transport network, a second type of congestion message is generated.

According to a further embodiment of the invention, a network component is provided. The network component comprises a first interface. The first interface is configured to receive data packets of a flow associated with a first bearer and data packets of a flow associated with a second bearer. Further, the network component comprises a second interface. The second interface is configured to transmit the data packets of the flow associated with the first bearer and the data packets of the flow associated with the second bearer. The network component is further provided with a bearer selector. The bearer selector is configured to select, in response to a congestion being detected on the first bearer, at least one of the first bearer and the second bearer for notification of the congestion in the associated flow.

According to a further embodiment of the invention, a network component is provided. The network component comprises a first interface. The first interface is configured to receive data packets of from a transport network. Further, the network component comprises a second interface. The second interface is configured to transmit the data packets on a radio link. The network component is further provided with a first congestion detector and a second congestion detector. The first congestion detector is configured to detect a congestion on the radio link. The second congestion detector is configured to detect a congestion in the transport network. The network component further comprises a congestion message generator. The congestion message generator is configured to generate a first type of congestion message in response to the congestion on the radio link detected by the first congestion detector and to generate a second type of congestion message in response to the congestion in the transport network detected by the second congestion detector.

According to further embodiments, other methods or network components may be provided.

DETAILED DESCRIPTION OF EMBODIMENTS

In the following, the invention will be explained in more detail by referring to exemplary embodiments and to the accompanying drawings. The illustrated embodiments relate to congestion handling in a mobile communication network, e.g. a communication network implementing HSPA or LTE according to the 3GPP specifications. However, it is to be understood that the concepts as described herein may also be applied in other types of communication networks.

Figure 1A:
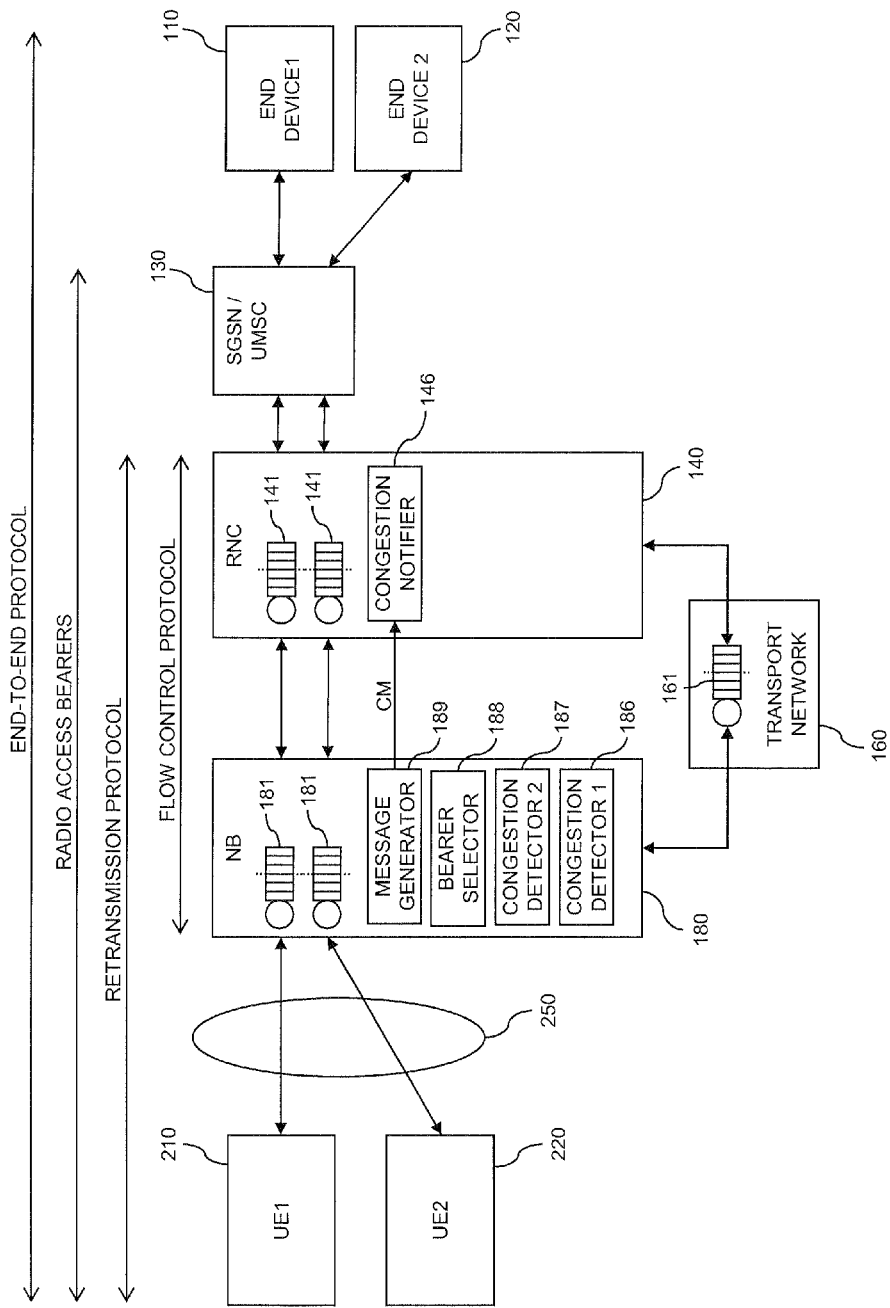
FIG. 1A schematically illustrates a mobile communication network environment implementing HSDPA, in which concepts of congestion handling according to an embodiment of the invention are applied.

FIG. 1A schematically illustrates a mobile communication network environment implementing HSDPA, in which concepts of congestion handling in accordance with embodiments of the invention are applied. In the illustrated example, a section of the mobile communication network environment is implemented as UTRAN in accordance with the 3GPP specifications.

As illustrated, the mobile communication network environment includes a radio access network in which a control node 140 is coupled via a transport network 160 to a radio access node 180 so as to convey data packets from end devices 110, 120 to UEs 210, 220, which are coupled to the radio access node 180 via a radio link 250. In accordance with the illustrated UTRAN implementation, the radio access node 180 is implemented as NodeB (NB), the control node 140 is implemented as a Radio Network Controller (RNC), and the transport network 160 is a Iub transport network. In this connection, it is to be understood that the transport network 160 may include one or more transport nodes (not illustrated) which are interfaced so as to allow conveying data packets between the control node 140 and the radio access node 180. Also it is to be understood that the end devices 110, 120 may actually correspond to various types of devices, including servers, remote terminals, and further UEs. In addition, a further control node is coupled between the control node 140 and the end devices 110, 120. In accordance with the illustrated UTRAN implementation, the further control node 130 is implemented as a Serving General Packet Radio Service Support Node (SGSN).

As further illustrated, different protocols or protocol layers may be used to convey data packets between the end devices 110, 120 and the UEs 210, 220. For illustrating the concepts of flow control and congestion handling as described herein, FIG. 1A shows an end-to-end protocol implemented between the end devices 110, 120 and the UEs 210, 220, a retransmission protocol implemented between the control node 140 and the UEs 210, 220, and a flow control protocol implemented between the control node 140 and the radio access node 180. The end-to-end protocol is a high layer protocol and, in the illustrated example, may be the of the TCP/IP type (TCP: Transport Control Protocol, IP: Internet Protocol). Other protocol types may be used as well, e.g. UDP (User Datagram Protocol) together with the real-time protocol (RTP) and/or its counterpart, the Real-Time Control Protocol (RTCP) to control the data rate. The retransmission protocol is a lower layer protocol. In the illustrated example the retransmission protocol is the RLC protocol, which is a link layer protocol. According to the retransmission protocol, data packets which were not successfully received are retransmitted, which involves some type of feedback mechanism from the retransmission protocol receiver to the retransmission protocol sender, e.g. by sending acknowledgement packets from the receiver to the sender. The flow control protocol may have the purpose of determining a desired send rate in the receiving entity (180, 140) of the protocol and providing this information to the transmitting entity (140, 180) of said protocol. The transmitting entity of the flow control protocol may enforce the requested send rate and communicate flow-specific information between the control node, e.g. sequence numbers of data packets. It is to be understood that the end-to-end protocol may be a retransmission protocol as well. In fact, the above mentioned examples of possible end-to-end protocols include retransmission functionalities as well. Further, the end-to-end protocol may also include flow control functionalities. In particular, if the end-to-end protocol sender is notified of a congestion in the transmission of data packets to the end-to-end protocol receiver, it may reduce its sending rate. On the other hand, if no congestions are notified for a given period of time, the end-to-end protocol sender may increase its sending rate. In this way, the end-to-end protocol may try to set a sending rate which is as high as possible, but still avoids excessive amounts of congestions. The above mentioned examples of end-to-end protocols include corresponding flow control functionalities.

In the above-mentioned examples of end-to-end protocols, the data packets include, typically in a corresponding header field, a source address, a destination address, a source port, and a destination port. On the basis of the source address, the destination address, the source port, and the destination port, an IP packet flow can be defined as a flow of IP packets between a source endpoint defined by the source address and the source port, and a destination endpoint defined by the destination address and the destination port. Typically, not all nodes in the mobile communication network environment as illustrated in FIG. 1A will have access to this end-to-end protocol information. For example, nodes in the transport network 160 as illustrated in FIG. 1 may operate on information of lower protocol layers only, e.g. on the basis of a low layer transport protocol as specified in the 3GPP technical specifications for the Iub transport network (see, e.g., 3GPP technical specification 25.430), and therefore not be able to interact with a flow-control mechanism of the end-to-end protocol. On the other hand, the control node 140, in the illustrated example the RNC, operates on the basis of the end-to-end protocol as well and can use the information in the header fields of the data packets so as to identify individual flows. Since the control node 140 is arranged between the source and destination endpoints of the end-to-end protocol flows, it may also be referred to as an intermediate node.

In addition, FIG. 1A also indicates bearers established between the further control node 130 and the UEs 210, 220. More specifically, a first bearer used to convey data between the first end device 110 and the first UE 210 extends from the further control node 130, via the control node 140, the transport network 160 and the radio access node 180, to the first UE 210, and a second bearer used to convey data between the second end device 120 and the second UE 220 extends from the further control node 130, via the control node 140, the transport network 160 and the radio access node 180, to the second UE 220. In this connection, a bearer is considered to be a channel having certain guaranteed transport attributes, e.g. with respect to Quality of Service (QoS). In accordance with the illustrated UTRAN implementation, the bearers may also be referred to as Radio Access Bearers.

In FIG. 1A an exemplary situation is illustrated in which a first flow extends from the end device 110 to the UE 210, and a second flow extends from the end device 120 to the UE 220. The first and the second flow are each transmitted via an associated bearer. In particular, the first flow is transmitted via the first bearer established between the UE 210 and the further control node 130, and the second flow is transmitted via the second bearer established between the UE 220 and the further control node 130. The first flow and the second flow are in the downlink direction, i.e. in the direction to the UEs 210, 220. Accordingly, the end device 110 corresponds to a first source endpoint of the first flow, the UE 210 corresponds to a first destination endpoint of the first flow, the end device 120 corresponds to a second source endpoint of the second flow, and the UE 220 corresponds to a second destination endpoint of the second flow. It is to be understood that additional flows may be present as well and the first flow and the second flow may be regarded as examples of a plurality of flows. Also, it is to be understood that typically also uplink flows will be present at the same time. For example, each downlink flow may carry data packets with payload data and may have a corresponding uplink flow in the opposite direction, which carries acknowledgement data packets. Further, it is to be understood that endpoints of different flows may be located in different physical devices (as illustrated in FIG. 1A), but may also be located in the same physical device. Nonetheless, these flows may be transmitted on different bearers. For example, there could be two or more flows having their destination endpoint in the same UE. In such flows, the destination endpoint may be identified by the same destination address, but by a different destination port. For example, such different flows having their destination endpoint located in the same UE could relate to different services, e.g., a Voice over IP (VoIP) service, a Mobile TV service, or a filesharing service. Such different services may also have different priority. For example, a VoIP service may have a higher priority than a Mobile TV service or a filesharing service.

In the mobile communication network environment of FIG. 1A, different types of congestions may occur. In particular congestions may occur in the transport network 160, or may occur on the radio link 250.

For example, there may be a congestion in the transport network 160 when transmitting the data packets from the control node 140 to the radio access node 180, which may be detected in the radio access node 180 on the basis of one or more data packets of the flow not being successfully received by the radio access node 180. In this respect, a packet not being successfully received means that the packet is received corrupted or not received at all. Further, there may be a congestion on the radio link 250 when transmitting the data packets from the radio access node 180 to the destination endpoint in the respective UE 210, 220. The latter type of congestion may be detected on the basis of at least one queuing parameter of a queue 181 to which the data packets of the flow are assigned before being transmitted via the radio link 250 to the respective UE 210, 220, e.g. a queuing delay of the queue 181 and/or a fill level of the queue 181. For example, if the queuing delay or fill level of the queue 181 exceeds a given threshold value, this may be interpreted as a congestion on the radio link 250. Typically, there will be at least one queue for each UE 210, 220 served by the radio access node 180. In some cases, multiple radio bearers may be established between the radio access node 180 and the UE 210, 220. In such cases, there may be a corresponding queue 181 for each of the radio bearers. In the radio access node 180, the data packets may be assigned to the different queues 181 on the basis of flow control information which is included into the data packets by the control node 140. This flow control information may include a sequence number of the data packets so as to allow for arranging the data packets in the queue in a given order. The control information may also be flow specific, i.e. allow for assigning data packets of a certain flow to a corresponding queue 181. In some embodiments, the flow control information may also be used to detect that a data packet of the flow was not successfully transmitted. For example, the data packet may have been dropped in the transport network 160 and therefore be missing in the queue 181 of the radio access node 180, which can be detected by the radio access node 180 when considering the sequence numbers of received data packets.

A congestion in the transport network 160 may also be locally detected in the transport network 160, e.g. on the basis of the fill level of a queue 161 in the transport network 160. For example, if the fill level of a queue 161 in the transport network 160 exceeds a given threshold value, this may be interpreted as a congestion. According to some embodiments, the transport network node locally detecting the congestion may react by dropping a packet from the queue, which is sometimes referred to as Active Queue Management (AQM). According to some embodiments, the transport network node locally detecting the congestion may also mark one or more data packets of the queue 161 with a congestion indicator, e.g. by setting an Explicit Congestion Notification (ECN) flag in a data packet of the queue 161. The flag is also known as ECN Congestion Experience (ECN-CE) flag. The radio access node 180 will then be able to detect the congestion on the basis of one or more missing data packets or on the basis of receiving one or more data packets which have been marked with the congestion indicator.

For detecting the above-mentioned types of congestion, the radio access node 180 is provided with a first congestion detector 186 and a second congestion detector 187. In accordance with the above explanations, the congestion detector 186 may detect congestions on the radio link 250 with respect to a downlink flow, which may be accomplished on the basis of a fill level of the queue 181 provided in the radio access node 180 for holding data packets of the downlink flow to be transmitted to the destination endpoint in the respective UE 210, 220. The congestion detector 187 may detect congestions in the transport network 160, which may be accomplished by detecting data packets of the downlink flow which are not successfully received by the radio access node 180. This may involve evaluating flow control information, e.g. a sequence number included into the data packets, from the control node 140. In some embodiments, the congestion detector 187 may detect a congestion in the transport network 160 by detecting that, in a given time window, a certain number of data packets of the downlink flow was not successfully received by the radio access node 180. The congestion detector may also detect the congestion on the basis of receiving one or more data packets from the transport network 160, which have been marked with a congestion indicator.

The radio access node 180 is further provided with a bearer selector 188 which receives indications of detected congestions from the first congestion detector 186 and the second congestion detector 187. In response to the indication of a detected congestion, the bearer selector 188 selects one or more bearers for notification of the detected congestion. The selection may be based on the type of the detected congestion. More specifically, if the detected congestion is on the radio link 250, as detected by the first congestion detector 186, the bearer selector 188 may select the bearer on which the congestion was detected. If the detected congestion is in the transport network 160, as detected by the second congestion detector 187, the bearer selector 188 may select at least one other bearer, having a lower priority than the bearer on which the congestion was detected, for notification of the congestion. For this purpose, the bearer selector 188 may determine a priority order of the bearers, e.g. based on absolute priorities or based on relative bitrates of the bearers. For example, desired relative bitrates may have been assigned to the bearers, and a bearer exceeding its desired relative bitrate may be determined to have a low priority. In some situations, the bearer selector 188 may also select multiple or even all bearers for notification of the congestion, e.g. if the bearers are determined to have substantially the same priorities.

The radio access node 180 is further provided with a congestion message generator 189 which receives an indication of the selected bearer from the bearer selector 188. The congestion message generator then generates a congestion message CM indicating the bearer or bearers as selected by the bearer selector 188. The congestion message CM may be transmitted via the transport network 160, e.g. using correspondingly defined fields in control messages of the flow control protocol such as capacity assignments or other types of feedback mechanism.

For receiving the congestion messages CM and for accomplishing congestion notification in response to the congestion messages CM, the control node 140 is provided with a congestion notifier 146. The congestion notifier 146 is configured to notify the detected congestion in the flow associated with the selected bearer as indicated in the congestion message CM. This may be accomplished by dropping one or more data packets of the flow associated with the selected bearer, e.g. from a corresponding queue 141 in the control node 140 or by marking one or more data packets of the flow associated with the selected bearer with a congestion indication, e.g. by setting an ECN flag.

Figure 1B:
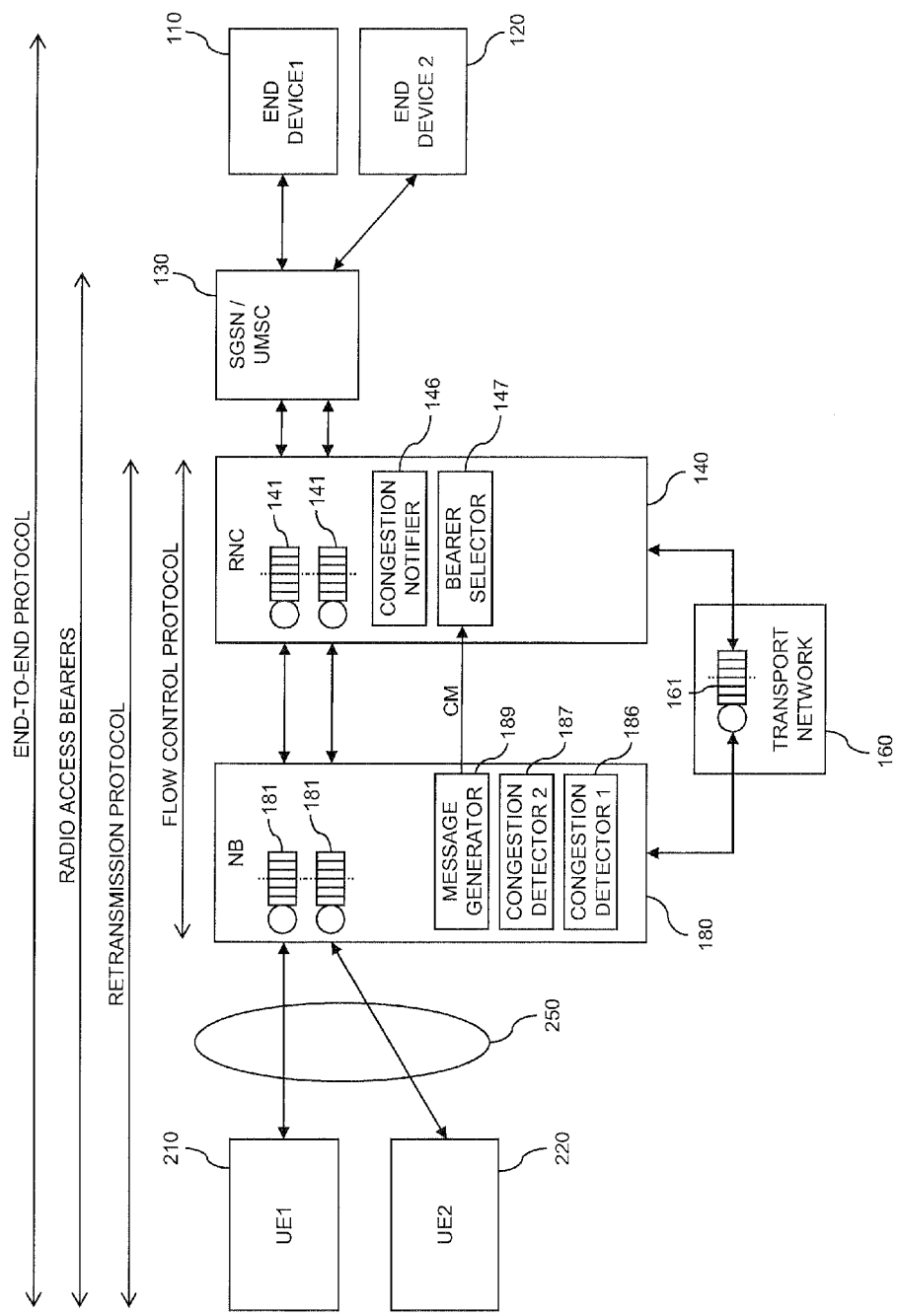
FIG. 1B schematically illustrates a mobile communication network environment implementing HSDPA, in which concepts of congestion handling according to a further embodiment of the invention are applied.

FIG. 1B shows a HSDPA implementation according to a further embodiment of the invention. In FIG. 1B, components which are similar to those of FIG. 1A have been illustrated with the same reference numerals. For details concerning these components, reference is made to the corresponding description in connection with FIG. 1A. In the following, only the differences as compared to the implementation of FIG. 1A will be explained.

In the embodiment of FIG. 1B the congestion message generator 189 is configured to report a congestion detected by the first congestion detector 186 or detected by the second congestion detector 187. In particular, the congestion message generator 189 may report a congestion on the radio link 250 as detected by the first congestion detector 186 by generating a first type of congestion message CM, hereinafter also referred to as message A. Further, the congestion message generator 189 may report a congestion in the transport network 160 as detected by the second congestion detector 187 by generating a second type of congestion message CM, hereinafter referred to as message B. The congestion message CM, i.e. message A or message B, is transmitted from the radio access node 180 to the control node 140, where it may be used by a bearer selector 147 in the control node 140 to select one of the bearers for notification of the congestion in the associated flow. The congestion message CM may be transmitted via the transport network 160, e.g. using correspondingly defined fields in acknowledgement data packets or other types of feedback mechanism. According to some embodiments, a message as defined in the known FP, e.g. a "rate up" message, could be reused as the message A, and a further message as defined in the known FP, e.g. a "rate down" message, could be reused as the message B. However, it is to be understood that reusing existing messages of the known FP means that these messages will be generated in response to different conditions and will also be interpreted in a different manner than according to the known FP. According to some embodiments, a message as defined in the known FP may be extended by optional information elements indicating the message A or the message B. For backward compatibility the desired rate might also be indicated in the congestion messages, i.e. in such embodiments, the message as defined in the known FP may comprise the information in accordance with the protocol so that a control node may evaluate different parts of the congestion message CM depending on whether it is adapted to interpret the optional elements or not. The congestion message CM may also indicate the bearer on which the congestion was detected, e.g. by being transmitted via a feedback channel established on this bearer.

As can be seen, the control node 140 of FIG. 1B is provided with a bearer selector 147 which receives the congestion messages CM from the congestion message generator 189 of the radio access node 180. Accordingly, in this implementation selection of the bearer on which the detected congestion is to be notified is accomplished in the control node 140. In response to the detected congestion as indicated by the received congestion message CM, the bearer selector 147 selects one or more bearers for notification of the detected congestion. The selection may be based on the type of the detected congestion. More specifically, if the detected congestion is on the radio link 250, as indicated by the first type of congestion message CM, i.e. message A, the bearer selector 147 may select the bearer on which the congestion was detected. If the detected congestion is in the transport network 160, as indicated by the second type of congestion message, i.e. message B, the bearer selector 147 may select at least one other bearer, having a lower priority than the bearer on which the congestion was detected, for notification of the congestion. For this purpose, the bearer selector 147 may determine a priority order of the bearers, e.g. based on absolute priorities or based on relative bitrates of the bearers. For example, desired relative bitrates may have been assigned to the bearers, and a bearer exceeding its desired relative bitrate may be determined to have a low priority. In some situations, the bearer selector 147 may also select multiple or even all bearers for notification of the congestion, e.g. if the bearers are determined to have substantially the same priorities.

The bearer selector 147 in the control node 140 indicates the selected bearer to the congestion notifier 146 which notifies the detected congestion in the flow associated with the selected bearer as indicated by the bearer selector 147. This may be accomplished by dropping one or more data packets of the flow associated with the selected bearer, e.g. from a corresponding queue 141 in the control node 140 or by marking one or more data packets of the flow associated with the selected bearer with a congestion indication, e.g. by setting a ECN flag.

In the following, the handling of congestions in downlink flows in the downlink implementations of FIGS. 1A and 1B will be further explained by referring to exemplary scenarios involving two downlink flows, referred to as first downlink flow and second downlink flow. When referring to the exemplary mobile communication network environment of FIG. 1A or 1B, the first downlink flow could extend from the end device 110 to the UE 210, and the second downlink flow could extend from the end device 120 to the UE 220. However, it is to be understood that this is merely an illustrative example and that the first downlink flow and the second downlink flow could be any types of downlink flows, which are co-transmitted from the control node 140 to the radio access node 180 via the transport network 160. It is further assumed that the first downlink flow has a higher priority than the second downlink flow. For example, as mentioned above, the first and second downlink flows may relate to different services, and the service of the first downlink flow may have a higher priority than the service of the second downlink flow. Further, the first and second downlink flows may relate to different users and the user of the first downlink flow may have a higher priority than the user of the second downlink flow, e.g. due to the user of the first downlink flow having a premium contract. The priority information may be preconfigured in the control node 140 or may be configured by an operator, e.g. using an operations and maintenance (O&M) interface of the control node 140. The first and the second downlink flow are assigned to different bearers, one established between the further control node 130 and the UE 210, and the other established between the further control node 130 and the UE 220.

According to a first scenario, a congestion on the bearer transmitting the first downlink flow occurs on the radio link 250. This is detected by the congestion detector 186 in the radio access node 180, e.g. on the basis of a queuing parameter of the queue 181, to which the data packets of the first downlink flow are assigned before being transmitted via the radio link 250, exceeding a certain threshold value.

In the implementation of FIG. 1A, the congestion detector 186 indicates the detected congestion to the bearer selector 188 in the radio access node 180. In response to the detected congestion being on the radio link 250, the bearer selector 188 selects the same bearer on which the congestion was detected, i.e. the bearer transmitting the first downlink flow, for notification of the detected congestion and indicates the selected bearer to the congestion message generator 189. The congestion message generator then generates a congestion message CM indicating the selected bearer, which is transmitted to the control node 140. The congestion message CM is received by the congestion notifier 146 in the control node 140.

In the implementation of FIG. 1B, the congestion detector 186 indicates the detected congestion to the congestion message generator 189 in the radio access node 180 which then generates the first type of congestion message CM, i.e. message A. The congestion message is transmitted to the control node 140. The congestion message CM, i.e. message A, is received by the bearer selector 147 in the control node 140. In response to the detected congestion being on the radio link 250, the bearer selector 147 selects the same bearer on which the congestion was detected, i.e. the bearer transmitting the first downlink flow, for notification of the detected congestion and indicates the selected bearer to the congestion notifier 146.

The congestion notifier 146 notifies the congestion in the downlink flow associated with the selected bearer, in the first downlink flow. Depending on the implementation of the end-to-end protocol, this may be accomplished by dropping one or more data packets of the first downlink flow and/or by including a congestion indication, e.g. by setting an ECN flag, into one or more data packets of the first downlink flow. When accomplishing the notification by dropping one or more data packets, the source endpoint of the first downlink flow may become aware of the congestion due to a failure to receive acknowledgement packets for the dropped data packets. When accomplishing the notification by including a congestion indication into one or more data packets, the source endpoint of the first downlink flow may become aware of the congestion due to receiving acknowledgement packets which reflect the congestion indication. The source endpoint of the first downlink flow may react to the congestion by reducing the sending rate of the first downlink flow.

According to a second scenario, a congestion on the bearer transmitting the first downlink flow occurs in the transport network 160. This is detected by the congestion detector 187 in the radio access node 180, e.g. on the basis of a data packet of the first downlink flow not successfully received from the transport network 160 or on the basis of receiving a data packet of the first downlink flow, which was marked with a congestion indicator.

In the implementation of FIG. 1A, the congestion detector 187 indicates the detected congestion to the bearer selector 188 in the radio access node 180. In response to the detected congestion being in the transport network 160, the bearer selector 188 selects one or more of the bearers, e.g. the bearer transmitting the second downlink flow, for notification of the detected congestion and indicates the selected bearer to the congestion message generator 189. This selection is based on priorities of the bearers, e.g. absolute bearer priorities or priorities based on relative bitrates of the bearers. Assuming that the bearer transmitting the second uplink flow was determined to have the lower priority, e.g. due to exceeding its desired relative bitrate, this bearer is selected. The congestion message generator then generates a congestion message CM indicating the selected bearer, which is transmitted to the control node 140. The congestion message CM is received by the congestion notifier 146 in the control node 140.

In the implementation of FIG. 1B, the congestion detector 187 indicates the detected congestion to the congestion message generator 189 in the radio access node 180 which then generates the second type of congestion message CM, i.e. message B. The congestion message CM is transmitted to the control node 140. The congestion message CM, i.e. message B, is received by the bearer selector 147 in the control node 140. In response to the detected congestion being in the transport network 160, the bearer selector 147 selects one of the bearers transmitted through the radio access node 180, e.g. the bearer transmitting the second downlink flow, for notification of the detected congestion and indicates the selected bearer to the congestion message generator 189. This selection is based on a priorities of the bearers, e.g. absolute bearer priorities or priorities based on relative bitrates of the bearers. Assuming that the bearer transmitting the second uplink flow was determined to have the lower priority, e.g. due to exceeding its desired relative bitrate, this bearer is selected. The bearer selector 147 then indicates the selected bearer to the congestion notifier 146.

The congestion notifier 146 notifies the congestion in the downlink flow associated with the selected bearer. For example, this may be the bearer transmitting the second downlink flow. Depending on the implementation of the end-to-end protocol, this may be accomplished by dropping one or more data packets of the second downlink flow and/or by including a congestion indication, e.g. by setting an ECN flag, into one or more data packets of the second downlink flow. When accomplishing the notification by dropping one or more data packets, the source endpoint of the second downlink flow may become aware of the congestion due to a failure to receive acknowledgement packets for the dropped data packets. When accomplishing the notification by including a congestion indication into one or more data packets, the source endpoint of the second downlink flow may become aware of the congestion due to receiving acknowledgement packets which reflect the congestion indication. The source endpoint of the second downlink flow may react to the congestion by reducing the sending rate of the first downlink flow. This at the same time makes additional resources available for transmitting the data packets of the first downlink flow.

Figure 1C:
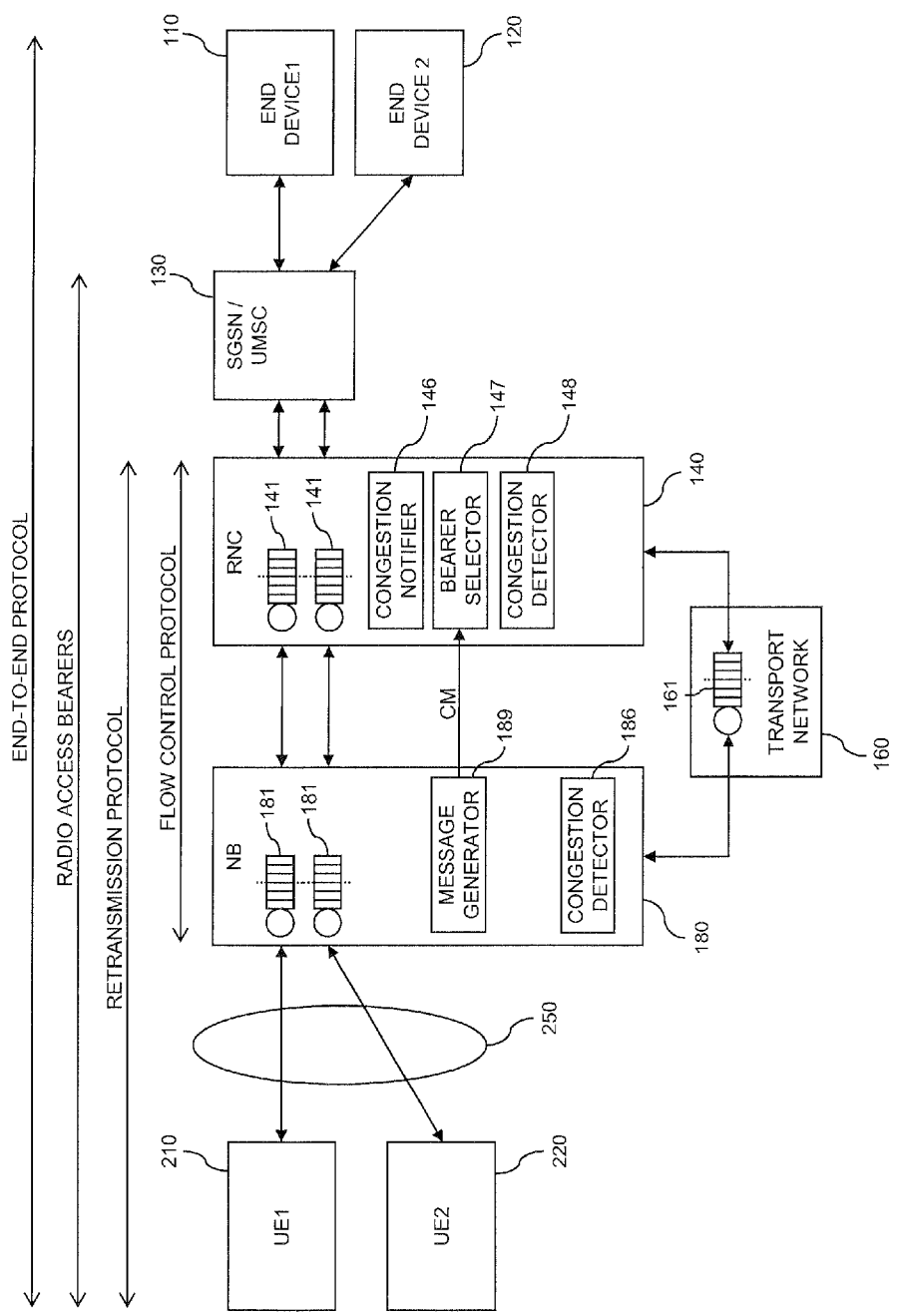
FIG. 1C schematically illustrates a mobile communication network environment implementing HSUPA, in which concepts of congestion handling according to a further embodiment of the invention are applied.

FIG. 1C shows a HSUPA implementation according to an embodiment of the invention. In FIG. 1C, components which are similar to those of FIGS. 1A and 1B have been illustrated with the same reference numerals. For details concerning these components, reference is made to the corresponding description in connection with FIGS. 1A and 1B. In the following, only the differences as compared to the downlink implementations of FIGS. 1A and 1B will be explained.

In FIG. 1C an exemplary situation is illustrated in which a first flow extends from the UE 210 to the end device 110 and a second flow extends from the UE 220 to the end device 120. The first and the second flow are each transmitted via an associated bearer. In particular, the first flow is transmitted via the first bearer established between the UE 210 and the further control node 130, and the second flow is transmitted via the second bearer established between the UE 220 and the further control node 130. The first flow and the second flow are in the uplink direction, i.e. in the direction from the UEs 210, 220. Accordingly, the UE 210 corresponds to a first source endpoint of the first flow, the end device 110 corresponds to a first destination endpoint of the first flow, the UE 220 corresponds to a second source endpoint of the second flow, and the end device 120 corresponds to a second destination endpoint of the second flow. It is to be understood that additional flows may be present as well and the first flow and the second flow may be regarded as examples of a plurality of flows. Also, it is to be understood that typically also downlink flows will be present at the same time. For example, each uplink flow may carry data packets with payload data and may have a corresponding downlink flow in the opposite direction, which carries acknowledgement data packets. Further, it is to be understood that endpoints of different flows may be located in different physical devices (as illustrated in FIG. 1C), but may also be located in the same physical device. Nonetheless, these flows may be transmitted on different bearers. For example, there could be two or more flows having their source endpoint in the same UE. In such flows, the source endpoint may be identified by the same source address, but by a different source port. For example, such different flows having their source endpoint located in the same UE could relate to different services, e.g., a Voice over IP (VoIP) service, a Mobile TV service, or a filesharing service. Such different services may also have different priority. For example, a VoIP service may have a higher priority than a Mobile TV service or a filesharing service.

In the mobile communication network environment of FIG. 1C, there may be a congestions on the radio link 250 and congestions in the transport network 160 as well. A congestion in the transport network 160 when transmitting data packets from the radio access node 180 via the transport network 160 to the control node 140 will typically result in one or more data packets of the uplink flow not being successfully received by the control node 140. In some embodiments this may be detected on the basis of flow control information included into the data packets by the radio access node 180, e.g. a sequence number of the data packets. A congestion on the radio link 250 when transmitting the data packets from the UE 210, 220 to the radio access node 180 may be detected by the radio access node 180 on the basis of data packets not being successfully received by the radio access node 180 or on the basis of the radio access node 180 not being able to schedule the uplink transmission of one or more data packets. Such situations may occur, e.g., if the UE 210, 220 looses the radio connection to the radio access node 180 or the radio connection is disturbed by interferences or if the data rate offered by the source endpoint of the flow of data packets exceeds the throughput of the radio connection.

A congestion in the transport network 160 may also be locally detected in the transport network 160, e.g. on the basis of the fill level of a queue 161 in the transport network 160. For example, if the fill level of a queue 161 in the transport network 160 exceeds a given threshold value, this may be interpreted as a congestion. According to some embodiments, the transport network node locally detecting the congestion may react by dropping a packet from the queue, which is sometimes referred to as Active Queue Management (AQM). According to some embodiments, the transport network node locally detecting the congestion may also mark one or more data packets of the queue 161 with a congestion indicator, e.g. by setting an Explicit Congestion Notification (ECN) flag in a data packet of the queue 161. The control node 140 will then be able to detect the congestion on the basis of one or more missing data packets or on the basis of receiving one or more data packets which have been marked with the congestion indicator.

For detecting the above-mentioned congestions on the radio link 250, the radio access node 180 is provided with a congestion detector 186. In accordance with the above explanations, the congestion detector 186 may detect congestions on the radio link 250 with respect to a uplink flow, which may be accomplished by detecting data packets of the uplink flow which are not successfully received by the radio access node 180 or by detecting a failure of the radio access node 180 to schedule the uplink transmission of one or more data packets via the radio link 250. In some embodiments, the congestion detector 186 may detect a congestion in the radio link 250 by detecting that, in a given time window, a certain number of data packets of the uplink flow was not successfully received by the radio access node 180. In some embodiments, the congestion detector 186 may detect a congestion on the radio link 250 by detecting that the queue size reported by the UE 210, 220 exceeds a predefined threshold.

The radio access node 180 further includes a congestion message generator 189 which is configured to report a congestion on the radio link as detected by the congestion detector 186. In particular, the congestion message generator 189 may report a congestion on the radio link 250 by generating a congestion message CM. The congestion message may indicate the type of congestion, e.g. uplink congestion on the radio link 250, and also the bearer on which the congestion was detected, e.g. by being transmitted via a feedback channel established on this bearer. The congestion message CM is transmitted from the radio access node 180 to the control node 140, where it may be used by a bearer selector 147 of the control node 140 to select a bearer for notification of the detected congestion. The congestion message CM may be transmitted via the transport network 160, e.g. using correspondingly defined fields in acknowledgement data packets or in control packets of the FP or other types of feedback mechanism.

As further illustrated, the control node 140 is provided with a congestion detector 148. In accordance with the above explanations, the congestion detector 148 may detect congestions in the transport network 160 with respect to an uplink flow, which may be accomplished by detecting data packets of the uplink flow which are not successfully received by the control node 140. This may involve evaluating flow control information, e.g. a sequence number included into the data packets, from the radio access node 180. The congestion detector 148 indicates the detected congestions to the bearer selector 147 of the control node 140. The congestion detector may also detect the congestion on the basis of receiving one or more data packets from the transport network 160, which have been marked with a congestion indicator.

In the uplink implementation of FIG. 1C, the bearer selector 147 in the control node 140 accomplishes bearer selection on the basis of the type of detected congestion, i.e. a congestion on the radio link 250 as indicated by the congestion message CM received from the congestion message generator 189 of the radio access node 180 or a congestion in the transport network 160 as indicated by the congestion detector 148 in the control node 140. In response to the detected congestion, the bearer selector 147 selects one or more bearers for notification of the detected congestion. The selection may be based on the type of the detected congestion. More specifically, if the detected congestion is on the radio link 250, as detected by the congestion detector 186 in the radio access node 180, the bearer selector 147 may select the bearer on which the congestion was detected. If the detected congestion is in the transport network 160, as detected by the congestion detector 148 in the control node 140, the bearer selector 147 may select at least one other bearer, having a lower priority than the bearer on which the congestion was detected, for notification of the congestion. For this purpose, the bearer selector 147 may determine a priority order of the bearers, e.g. based on absolute priorities or based on relative bitrates of the bearers. For example, desired relative bitrates may have been assigned to the bearers, and a bearer exceeding its desired relative bitrate may be determined to have a low priority. In some situations, the bearer selector 147 may also select multiple or even all bearers for notification of the congestion, e.g. if the bearers are determined to have substantially the same priorities.

Similar as in the downlink implementations of FIGS. 1A and 1B, the congestion notifier 146 notifies the detected congestion in the flow associated with the selected bearer as indicated by the bearer selector 147. This may be accomplished by dropping one or more data packets of the flow associated with the selected bearer, e.g. from a corresponding queue 141 in the control node 140, or by marking one or more data packets of the flow associated with the selected bearer with a congestion indication, e.g. by setting a ECN flag.

In the following, handling of uplink flows will be further explained by referring to exemplary scenarios involving two uplink flows, referred to as first uplink flow and second uplink flow. When referring to the uplink implementation of FIG. 1C, the first uplink flow could extend from the UE 210 to the end device 110, and the second uplink flow could extend from the UE 220 to the end device 120. However, it is to be understood that this is merely an illustrative example and that the first uplink flow and the second uplink flow could be any types of uplink flows, which are co-transmitted from the radio access node 180 to the control node 140 via the transport network 160. It is further assumed that the first uplink flow has a higher priority than the second uplink flow. For example, as mentioned above, the first and second uplink flows may relate to different services, and the service of the first uplink flow may have a higher priority than the service of the second uplink flow. Further, the first and second uplink flows may relate to different users and the user of the first uplink flow may have a higher priority than the user of the second uplink flow, e.g. due to the user of the first uplink flow having a premium contract. The priority information may be preconfigured in the control node 140 or may be configured by an operator, e.g. using an operations and maintenance (O&M) interface of the control node 140. The first and the second uplink flow are assigned to different bearers, one established between the further control node 130 and the UE 210, and the other established between the further control node 130 and the UE 220.

According to a first scenario, a congestion on the bearer transmitting the first uplink flow occurs on the radio link 250. This is detected by the congestion detector 186 in the radio access node 180, e.g. on the basis a data packet of the first uplink flow not being successfully received in the radio access node 180 or on the basis of a failure of the radio access node

180 to schedule the uplink transmission of one or more data packets of the first uplink flow. The congestion detector 186 indicates the detected congestion to the congestion message generator 189 in the radio access node 180 which then generates the congestion message CM indicating the congestion on the radio link 250. The congestion message is transmitted to the control node 140, where it is received by the bearer selector 147. In response to the detected congestion being on the radio link 250, the bearer selector 147 selects the same bearer on which the congestion was detected, i.e. the bearer transmitting the first uplink flow, for notification of the detected congestion and indicates the selected bearer to the congestion notifier 146.

The congestion notifier 146 notifies congestion in the uplink flow associated with the selected bearer, i.e. in the first uplink flow. Depending on the implementation of the end-to-end protocol, this may be accomplished by dropping one or more data packets of the first uplink flow and/or by including a congestion indication, e.g. an ECN, into one or more data packets of the first uplink flow. When accomplishing the notification by dropping one or more data packets, the source endpoint of the first uplink flow may become aware of the congestion due to a failure to receive acknowledgement packets for the dropped data packets. When accomplishing the notification by including a congestion indication into one or more data packets, the source endpoint of the first uplink flow may become aware of the congestion due to receiving acknowledgement packets which reflect the congestion indication. The source endpoint of the first uplink flow may react to the congestion by reducing the sending rate of the first uplink flow.

According to a second scenario, a congestion on the bearer transmitting the first uplink flow occurs in the transport network 160. This is detected by the congestion detector 148 in the control node 140, e.g. on the basis of a data packet of the first uplink flow not being successfully received via the transport network 160 or being marked with a congestion indicator. The congestion detector 148 indicates the detected congestion to the bearer selector 147. In response to the detected congestion being in the transport network 160, the bearer selector 147 selects at least one of the bearers transmitting the first and second uplink flows, e.g. the bearer transmitting the second uplink flow, for notification of the detected congestion and indicates the selected bearer or bearers to the congestion notifier 146. This selection is based on priorities of the bearers. Assuming that the bearer transmitting the second uplink flow was determined to have the lower priority, e.g. due to exceeding its desired relative bitrate, this bearer is selected.

The congestion notifier 146 notifies the congestion in the uplink flow associated with the selected bearer. As mentioned above, this may be the bearer transmitting the second uplink flow. Depending on the implementation of the end-to-end protocol, this may be accomplished by dropping one or more data packets of the second uplink flow and/or by including a congestion indication, e.g. an ECN, into one or more data packets of the second uplink flow. When accomplishing the notification by dropping one or more data packets, the source endpoint of the second uplink flow may become aware of the congestion due to a failure to receive acknowledgement packets for the dropped data packets. When accomplishing the notification by including a congestion indication into one or more data packets, the source endpoint of the second uplink flow may become aware of the congestion due to receiving acknowledgement packets which reflect the congestion indication. The source endpoint of the second uplink flow may react to the congestion by reducing the sending rate of the second flow. In the transport network 160, this at the same time makes additional resources available for transmitting data packets of the first uplink flow.

According to the concepts as described above, the control node 140 and/or the radio access node 180 may operate with a fixed sending rate, e.g. the maximum possible sending rate. Complex flow control processes for adjusting the sending rates in these nodes are thus avoided. Rather, a flow control reaction may be initiated in the source endpoint of the end-to-end protocol.

Figure 2:
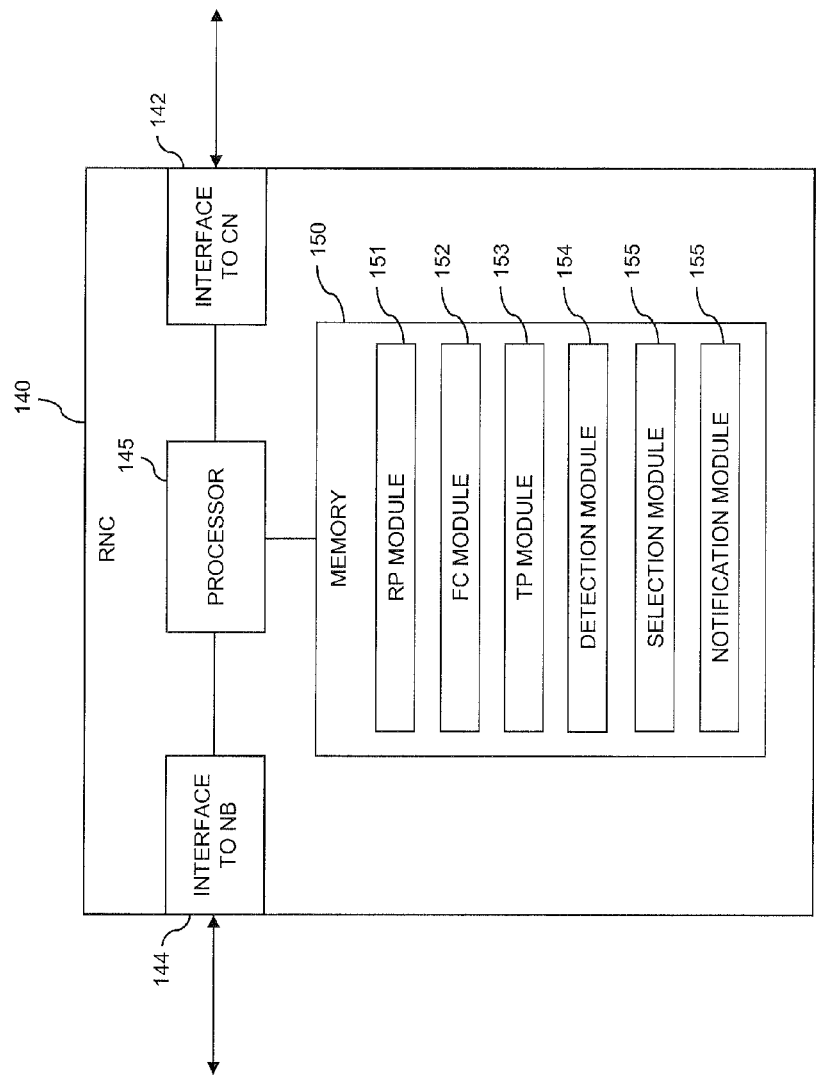
FIG. 2 schematically illustrates a network component according to an embodiment of the invention, which may be used as an intermediate node in the mobile communication network environment of FIG. 1A, 1B or 1C.

FIG. 2 further illustrates an exemplary implementation of the control node 140. As explained above, the control node 140 is implemented as an RNC to be used in a UTRAN according to the 3GPP technical specifications.

The control node 140 includes a core network (CN) interface 142, which may be implemented as a Iu interface according to the 3GPP technical specifications, and a radio access node interface 142, which has the purpose of coupling the control node 140 via the transport network 160 to the radio access node 180, i.e. NodeB. The core network interface 142 may also be used to implement the O&M interface of the control node. Further, the control node 140 includes a processor 145 coupled to the interfaces 142, 144 and a memory 150 coupled to the processor 145. The memory 150 may include a read-only memory (ROM), e.g. a flash ROM, a random-access memory (RAM), e.g. a Dynamic RAM (DRAM) or static RAM (SRAM), a mass storage, e.g. a hard disk or solid state disk, or the like. The memory 150 includes suitably configured program code to be executed by the processor 145 so as to implement the functionalities of the control node 140 as explained in connection with FIG. 1A,1B or 1C. More specifically, the memory 150 may include a retransmission protocol (RP) module 151 so as to implement functionalities of the retransmission protocol, e.g. the RLC protocol, a flow control (FC) module 152 flow control protocol functionalities, a transport protocol (TP) module 153 so as to implement functionalities of a transport protocol used for communication via the transport network 160, a detection module 154 so as to accomplish functionalities of the congestion detector 148, a selection module 155 so as to implement functionalities of the bearer selector 147, and a notification module 156 so as to implement functionalities of the congestion notifier 146. In this respect, it should be noted that in the downlink implementations of FIGS. 1A and 1B the detection module 154 may be omitted. Further, the selection module 155 may be omitted in the downlink implementation of FIG. 1A. A part of the memory 150 may also be used to implement the queues 141.

It is to be understood that the structure as illustrated in FIG. 2 is merely schematic and that the control node 140 may actually include further components which, for the sake of clarity, have not been illustrated, e.g. physical link layer interface structures. Also, it is to be understood that the memory 150 may include further types of program code modules, which have not been illustrated, e.g. program code modules for implementing known functionalities of an RNC in a UTRAN according to the 3GPP technical specifications.

Figure 3:
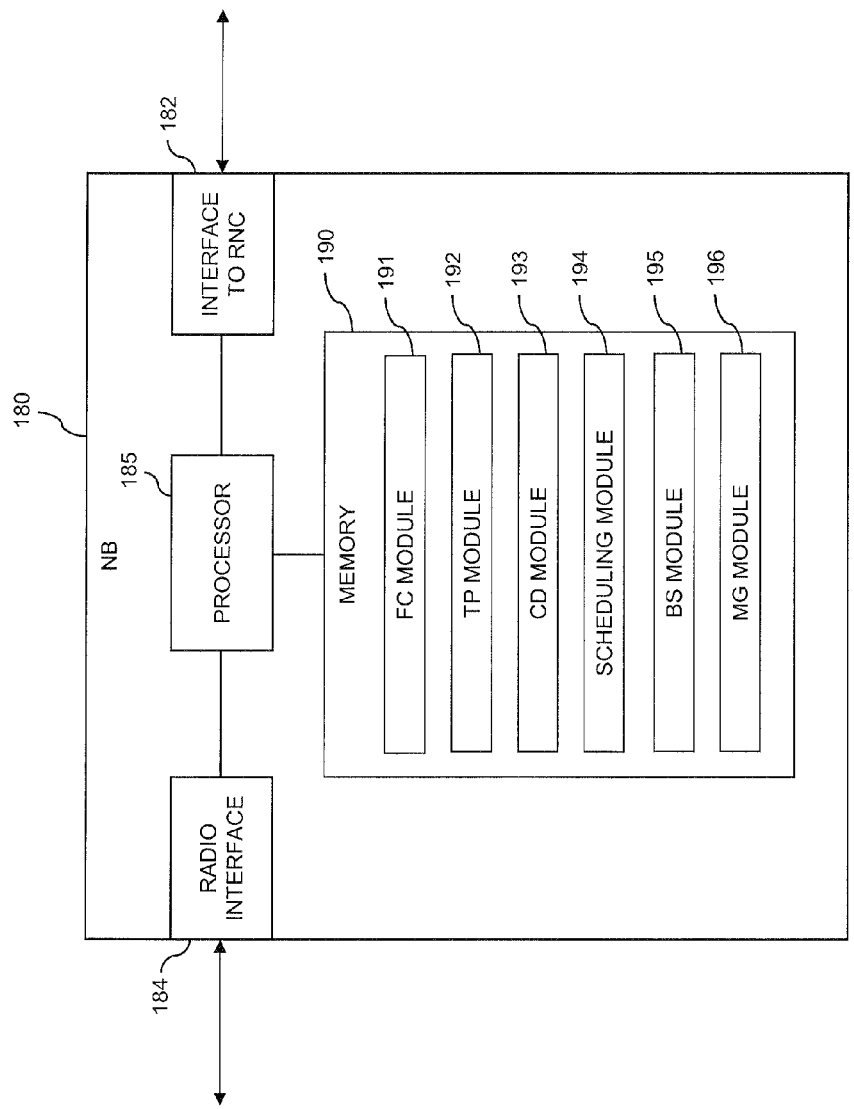
FIG. 3 schematically illustrates a further network component according to an embodiment of the invention, which may be used as a radio access node in the mobile communication network environment of FIG. 1A, 1B or 1C.

FIG. 3 further illustrates an exemplary implementation of the radio access node 180. As explained above, the radio access node 180 is implemented as a NodeB to be used in a UTRAN according to the 3GPP technical specifications.

The radio access node 180 includes a control node interface 182, which has the purpose of coupling the radio access node 180 via the transport network 160 to the control node 140, i.e. RNC, which may be implemented as the Iub interface according to the 3GPP technical specifications, and a radio interface 184, for coupling to one or more UEs via the radio link 250. In the illustrated example of a NodeB in a UTRAN according to the 3GPP technical specifications, the radio interface may be the Uu interface. Further, the radio access node 180 includes a processor 185 coupled to the interfaces 182, 184 and a memory 190 coupled to the processor 185. The memory 150 may include a read-only memory (ROM), e.g. a flash ROM, a random-access memory (RAM), e.g. a Dynamic RAM (DRAM) or static RAM (SRAM), a mass storage, e.g. a hard disk or solid state disk, or the like. The memory 190 includes suitably configured program code to be executed by the processor 185 so as to implement the functionalities of the radio access node 180 as explained in connection with FIG. 1A, 1B or 1C. More specifically, the memory 190 may include a flow control (FC) module 191 so as to implement functionalities of the flow control protocol, transport protocol (TP) module 192 so as to implement functionalities of the transport protocol used for communication via the transport network 160, a detection module 193 so as to accomplish functionalities of the congestion detector 186 and/or the congestion detector 187, a scheduling module 194 so as to accomplish scheduling of downlink and uplink transmissions of a UE served by the radio access node 180, a selection module 195 so as to implement functionalities of the bearer selector 188, and a message module so as to implement functionalities of the congestion message generator 189. In this respect, it should be noted that in the downlink implementation of FIG. 1B and in the uplink implementation of FIG. 1C the selection module 195 may be omitted. A part of the memory 190 may also be used to implement the queues 181.

It is to be understood that the structure as illustrated in FIG. 3 is merely schematic and that the control node 180 may actually include further components which, for the sake of clarity, have not been illustrated, e.g. physical link layer interface structures. Also, it is to be understood that the memory 190 may include further types of program code modules, which have not been illustrated, e.g. program code modules for implementing known functionalities of an NodeB in a UTRAN according to the 3GPP technical specifications.

Figure 4:
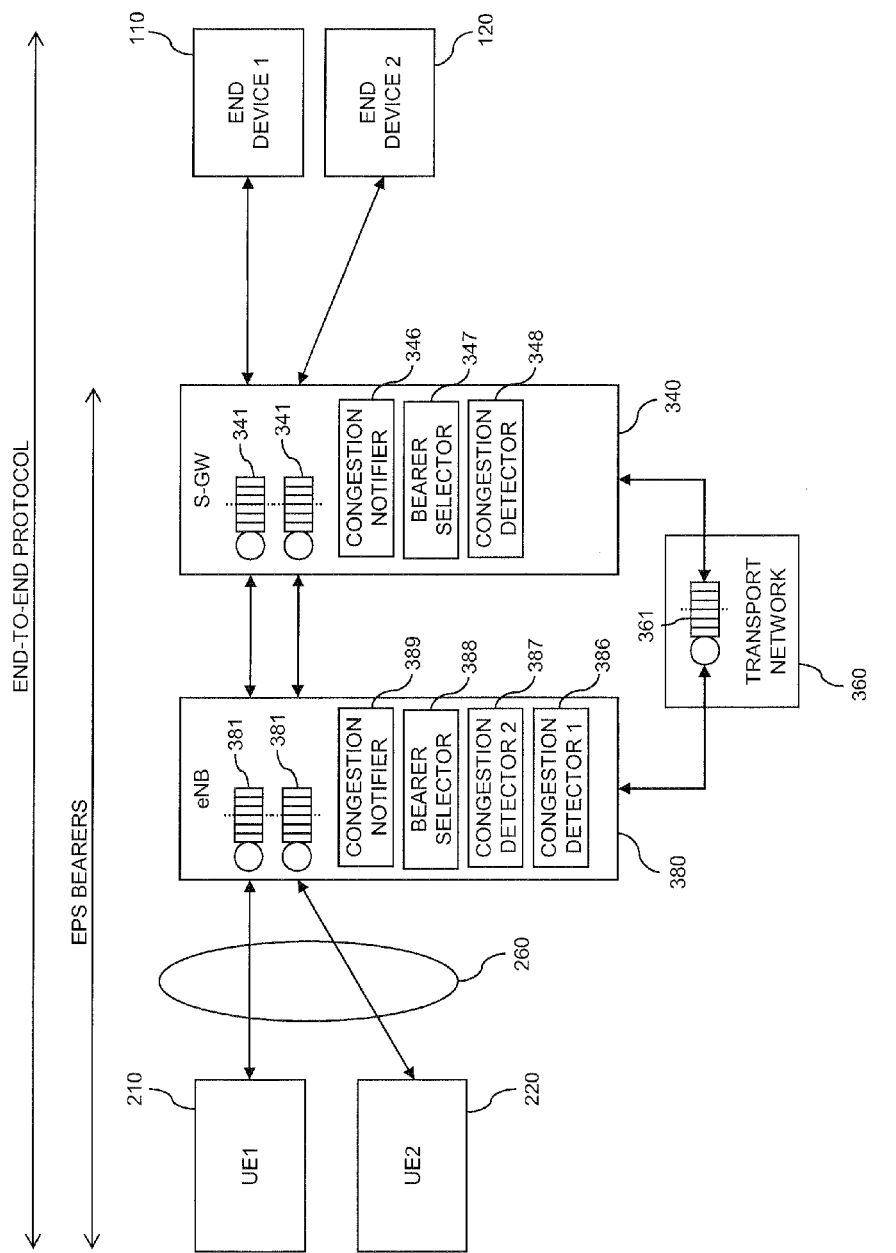
FIG. 4 schematically illustrates a mobile communication network environment implementing LTE, in which concepts of congestion handling according to an embodiment of the invention are applied.

FIG. 4 schematically illustrates a mobile communication network environment implementing LTE, in which concepts of congestion handling in accordance with embodiments of the invention are applied. In the illustrated example, a section of the mobile communication network environment is implemented as E-UTRAN in accordance with the 3GPP specifications.

As illustrated, the mobile communication network environment includes a radio access network in which a control node 340 is coupled via a transport network 360 to a radio access node 380 so as to convey data packets between end devices 110, 120 and UEs 210, 220, which are coupled to the radio access node 380 via a radio link 260. In accordance with the illustrated E-UTRAN implementation, the radio access node 380 is implemented as eNodeB (eNB), the control node 340 is implemented as a Serving Gateway (S-GW), and the transport network 360 is a transport network of the S1 interface. In this connection, it is to be understood that the transport network 360 may include one or more transport nodes (not illustrated) which are interfaced so as to allow conveying data packets between the control node 340 and the radio access node 380. This may also be a common transport network, e.g., used by LTE and HSPA networks in common. Also it is to be understood that the end devices 110, 120 may actually correspond to various types of devices, including servers, remote terminals, and further UEs. In addition, a further control node is coupled between the control node 340 and the end devices 110, 120.

As further illustrated, different protocols or protocol layers may be used to convey data packets between the end devices 110, 120 and the UEs 210, 220. For illustrating the concepts of flow control and congestion handling as described herein, FIG. 4 shows an end-to-end protocol implemented between the end devices 110, 120 and the UEs 210, 220. The end-to-end protocol is a high layer protocol and, in the illustrated example, may be of the TCP/IP type (TCP: Transport Control Protocol, IP: Internet Protocol). Other protocol types may be used as well, e.g. the UDP (User Datagram Protocol) together with the real-time protocol (RTP) and/or its counterpart, the Real-Time Control Protocol (RTCP). The end-to-end protocol may include flow control functionalities. In particular, if the end-to-end protocol sender is notified of a congestion in the transmission of data packets to the end-to-end protocol receiver, it may reduce its sending rate. On the other hand, if no congestions are notified for a given period of time, the end-to-end protocol sender may increase its sending rate. In this way, the end-to-end protocol may try to set a sending rate which is as high as possible, but still avoids excessive amounts of congestions. The above mentioned examples of end-to-end protocols include corresponding flow control functionalities.

In the above-mentioned examples of end-to-end protocols, the data packets include, typically in a corresponding header field, a source address, a destination address, a source port, and a destination port. On the basis of the source address, the destination address, the source port, and the destination port, an IP packet flow can be defined as a flow of IP packets between a source endpoint defined by the source address and the source port, and a destination endpoint defined by the destination address and the destination port. Typically, not all nodes in the mobile communication network environment as illustrated in FIG. 4 will have access to this end-to-end protocol information. For example, nodes in the transport network 360 as illustrated in FIG. 4 may operate on information of lower protocol layers only, e.g. on the basis of a low layer transport protocol as specified in the 3GPP technical specifications for the S1 interface (see, e.g., 3GPP technical specification 36.410), and therefore not be able to interact with flow control mechanisms of the end-to-end protocol. Since the control node 340 is arranged between the source and destination endpoints of the end-to-end protocol flows, it may also be referred to as an intermediate node.

In addition, FIG. 4 also indicates bearers established between the control node 340 and the UEs 210, 220. More specifically, a first bearer used to convey data between the first end device 110 and the first UE 210 extends from the further control node 340, the transport network 360 and the radio access node 380, to the first UE 210, and a second bearer used to convey data between the second end device 120 and the second UE 220 extends from the control node 340, via the transport network 360 and the radio access node 380, to the second UE 220. In this connection, a bearer is considered to be a channel having certain guaranteed transport attributes, e.g. with respect to Quality of Service (QoS). In accordance with the illustrated E-UTRAN implementation, the bearers may also be referred to as Evolved Packet System (EPS) Bearers.

In FIG. 4 an exemplary situation is illustrated in which a first flow extends from the end device 110 to the UE 210, and a second flow extends from the end device 120 to the UE 220. The first and the second flow are each transmitted via an associated bearer. In particular, the first flow is transmitted via the first bearer established between the UE 210 and the control node 340, and the second flow is transmitted via the second bearer established between the UE 220 and the control node 340. The first flow and the second flow may be in the downlink direction, i.e. in the direction to the UEs 210, 220.

In this case, the end device 110 corresponds to a first source endpoint of the first flow, the UE 210 corresponds to a first destination endpoint of the first flow, the end device 120 corresponds to a second source endpoint of the second flow, and the UE 220 corresponds to a second destination endpoint of the second flow. The first flow and the second flow may also be in the uplink direction, i.e. in the direction from the UEs 210, 220. In this case, the UE 110 corresponds to a first source endpoint of the first flow, the end device 110 corresponds to a first destination endpoint of the first flow, the UE 220 corresponds to a second source endpoint of the second flow, and the end device 120 corresponds to a second destination endpoint of the second flow. It is to be understood that additional flows may be present as well and the first flow and the second flow may be regarded as examples of a plurality of flows. Also, it is to be understood that typically downlink flows and uplink flows will be present at the same time. For example, a downlink flow may carry data packets with payload data and may have a corresponding uplink flow in the opposite direction, which carries acknowledgement data packets. Similarly, an uplink flow may carry data packets with payload data and may have a corresponding downlink flow in the opposite direction, which carries acknowledgement data packets. Further, it is to be understood that endpoints of different flows may be located in different physical devices (as illustrated in FIG. 4), but may also be located in the same physical device. Nonetheless, these flows may be transmitted on different bearers. For example, there could be two or more flows having their source/destination endpoint in the same UE. In such flows, the source/destination endpoint may be identified by the same source/destination address, but by a different source/destination port. For example, such different flows having their source/destination endpoint located in the same UE could relate to different services, e.g., a Voice over IP (VoIP) service, a Mobile TV service, or a filesharing service. Such different services may also have different priority. For example, a VoIP service may have a higher priority than a Mobile TV service or a filesharing service.

In the mobile communication network environment of FIG. 4, different types of congestions may occur. In particular congestions may occur in the transport network 360, or may occur on the radio link 260.

For example, there may be a congestion in the transport network 360 when transmitting the data packets from the control node 340 to the radio access node 380, which may be detected in the radio access node 380 on the basis of one or more data packets of the flow not being successfully received by the radio access node 380. Further, there may be a congestion on the radio link 260 when transmitting the data packets from the radio access node 380 to the destination endpoint in the respective UE 210, 220. The latter type of congestion may be detected on the basis of at least one queuing parameter of a queue 381 to which the data packets of the flow are assigned before being transmitted via the radio link 260 to the respective UE 210, 220, e.g. a queuing delay of the queue 381 and/or a fill level of the queue 381. For example, if the queuing delay or fill level of the queue 381 exceeds a given threshold value, this may be interpreted as a congestion on the radio link 260. Typically, there will be at least one queue for each UE 210, 220 served by the radio access node 380. In some cases, multiple radio bearers may be established between the radio access node 380 and the UE 210, 220. In such cases, there may be a corresponding queue 381 for each of the radio bearers.

A congestion in the transport network 360 may also be locally detected in the transport network 360, e.g. on the basis of at least one queuing parameter of a queue 361 in the transport network 360. The queuing parameter may be a queuing delay of the queue 361 and/or a fill level of the queue 361. For example, if the queuing parameter of the queue 361 in the transport network 360 exceeds a given threshold value, this may be interpreted as a congestion. According to some embodiments, the transport network node locally detecting the congestion may react by dropping a packet from the queue, which is sometimes referred to as Active Queue Management (AQM). According to some embodiments, the transport network node locally detecting the congestion may also mark one or more data packets of the queue 361 with a congestion indicator, e.g. by setting an Explicit Congestion Notification (ECN) flag in a data packet of the queue 361. The radio access node 380 will then be able to detect the congestion on the basis of receiving one or more data packets which have been marked with the congestion indicator.

A congestion in the transport network 360 when transmitting data packets from the radio access node 380 via the transport network 360 to the control node 340 will typically result in one or more data packets of the uplink flow not being successfully received by the control node 340. A congestion on the radio link 260 when transmitting the data packets from the UE 210, 220 to the radio access node 380 may be detected by the radio access node 380 on the basis of data packets not being successfully received by the radio access node 380 or on the basis of the radio access node 380 not being able to schedule the uplink transmission of one or more data packets. Such situations may occur, e.g., if the UE 210, 220 looses the radio connection to the radio access node 380 or the radio connection is disturbed by interferences or if the data rate offered by the source endpoint of the flow of data packets exceeds the throughput of the radio connection.

For detecting some of the above-mentioned types of congestions, the radio access node 380 is provided with a first congestion detector 386 and a second congestion detector 387. In accordance with the above explanations, the congestion detector 386 may detect congestions on the radio link 260 with respect to a downlink flow, which may be accomplished on the basis of a queuing parameter of the queue 381 provided in the radio access node 380 for holding data packets of the downlink flow to be transmitted to the destination endpoint in the respective UE 210, 220. In some embodiments, the congestion detector 386 may detect a congestion on the radio link 260 by detecting that, in a given time window, a certain number of data packets of the uplink flow was not successfully received by the radio access node 380. In accordance with the above explanations, the first congestion detector 386 may also detect congestions on the radio link 260 with respect to an uplink flow, which may be accomplished by detecting data packets of the uplink flow which are not successfully received by the radio access node 380 or by detecting a failure of the radio access node 380 to schedule the uplink transmission of one or more data packets via the radio link 260 or by detecting based on buffer status reports provided by the UE to the radio access node that the queue of data packets in the UE exceeds a pre-defined threshold. In some embodiments, the first congestion detector 386 may detect a congestion in the radio link 260 by detecting that, in a given time window, a certain number of data packets of the uplink flow was not successfully received by the radio access node 380.

In accordance with the above explanations, the congestion detector 387 may detect congestions in the transport network 360, which may be accomplished by detecting data packets of a downlink flow which are not successfully received by the radio access node 380. This may involve evaluating control information. In some embodiments, the congestion detector 387 may detect a congestion in the transport network 360 by detecting that, in a given time window, a certain number of data packets of the downlink flow was not successfully received by the radio access node 380. The congestion detector 387 may also detect a congestion in the transport network 360 by receiving one or more data packets of the downlink flow which have been marked with a congestion indication, e.g. an ECN flag, in the transport network 360.

The radio access node 380 is further provided with a bearer selector 388 which receives indications of detected congestions from the first congestion detector 386 and the second congestion detector 387. In response to the indication of a detected congestion, the bearer selector 388 selects one or more bearers for notification of the detected congestion. The selection may be based on the type of the detected congestion. More specifically, if the detected congestion is on the radio link 260, as detected by the first congestion detector 386, the bearer selector 388 may select the bearer on which the congestion was detected. If the detected congestion is in the transport network 360, as detected by the second congestion detector 387, the bearer selector 388 may select at least one other bearer, having a lower priority than the bearer on which the congestion was detected, for notification of the congestion. For this purpose, the bearer selector 388 may determine priorities of the bearers, e.g. based on absolute priorities or based on relative bitrates of the bearers. For example, desired relative bitrates may have been assigned to the bearers, and a bearer exceeding its desired relative bitrate may be determined to have a low priority. In some situations, the bearer selector 388 may also select multiple or even all bearers for notification of the congestion, e.g. if the bearers are determined to have substantially the same priorities.

The radio access node 380 is further provided with a congestion notifier 389 which receives an indication of the selected bearer from the bearer selector 388. The congestion notifier 389 is configured to notify the detected congestion in the flow associated with the selected bearer as indicated by the bearer selector 388. This may be accomplished by dropping one or more data packets of the flow associated with the selected bearer, e.g. from a corresponding queue 381 in the radio access node 380 or by marking one or more data packets of the flow associated with the selected bearer with a congestion indication, e.g. by setting an ECN flag.

For detecting the congestions in the transport network 360 occurring in uplink flows, the control node 340 is provided with a congestion detector 348. In accordance with the above explanations, the congestion detector 348 may detect the congestions in the transport network by detecting data packets of an uplink flow which are not successfully received by the control node 340. The congestion detector 348 indicates the detected congestions to the bearer selector 347 of the control node 340. The congestion detector 348 may also detect a congestion in the transport network 360 by receiving one or more data packets of the uplink flow which have been marked with a congestion indication, e.g. an ECN flag, in the transport network 360. The congestion detector 348 indicates the detected congestions to the bearer selector 347 of the control node 340.

The control node 340 is further provided with a bearer selector 347 which receives indications of detected congestions from the congestion detector 348. In response to the indication of a detected congestion, the bearer selector 347 selects one or more bearer for notification of the detected congestion. The selection is accomplished on the basis of priorities of the bearers. For this purpose, the bearer selector 347 may determine priorities of the bearers, e.g. based on absolute priorities or based on relative bitrates of the bearers. For example, desired relative bitrates may have been assigned to the bearers, and a bearer exceeding its desired relative bitrate may be determined to have a low priority. In some situations, the bearer selector 347 may also select multiple or even all bearers for notification of the congestion, e.g. if the bearers are determined to have substantially the same priorities.

The control node 340 is further provided with a congestion notifier 346 which receives an indication of the selected bearer from the bearer selector 347. The congestion notifier 346 is configured to notify the detected congestion in the flow associated with the selected bearer as indicated by the bearer selector 347. This may be accomplished by dropping one or more data packets of the flow associated with the selected bearer, e.g. from a corresponding queue 341 in the control node 340 or by marking one or more data packets of the flow associated with the selected bearer with a congestion indication, e.g. by setting an ECN flag.

In the following, the handling of congestions in downlink flows in the implementation of FIG. 4 will be further explained by referring to exemplary scenarios involving two downlink flows, referred to as first downlink flow and second downlink flow. When referring to the exemplary mobile communication network environment of FIG. 4, the first downlink flow could extend from the end device 110 to the UE 210, and the second downlink flow could extend from the end device 120 to the UE 220. However, it is to be understood that this is merely an illustrative example and that the first downlink flow and the second downlink flow could be any types of downlink flows, which are co-transmitted from the control node 340 to the radio access node 380 via the transport network 360. It is further assumed that the first downlink flow has a higher priority than the second downlink flow. For example, as mentioned above, the first and second downlink flows may relate to different services, and the service of the first downlink flow may have a higher priority than the service of the second downlink flow. Further, the first and second downlink flows may relate to different users and the user of the first downlink flow may have a higher priority than the user of the second downlink flow, e.g. due to the user of the first downlink flow having a premium contract. The priority information may be preconfigured in the radio access node 380 or may be configured by an operator, e.g. using an operations and maintenance (O&M) interface of the control node 380. The first and the second downlink flow are assigned to different bearers, one established between the control node 340 and the UE 210, and the other established between the further control node 340 and the UE 220.

According to a first scenario, a congestion on the bearer transmitting the first downlink flow occurs on the radio link 260. This is detected by the congestion detector 386 in the radio access node 380, e.g. on the basis of a queuing parameter of the queue 381, to which the data packets of the first downlink flow are assigned before being transmitted via the radio link 260, exceeding a certain threshold value.

The congestion detector 386 indicates the detected congestion to the bearer selector 388 in the radio access node 380. In response to the detected congestion being on the radio link 260, the bearer selector 388 selects the same bearer on which the congestion was detected, i.e. the bearer transmitting the first downlink flow, for notification of the detected congestion and indicates the selected bearer to the congestion notifier 389.

The congestion notifier 389 notifies the congestion in the downlink flow associated with the selected bearer, in the first downlink flow. Depending on the implementation of the end-to-end protocol, this may be accomplished by dropping one or more data packets of the first downlink flow and/or by including a congestion indication, e.g. by setting an ECN flag, into one or more data packets of the first downlink flow. When accomplishing the notification by dropping one or more data packets, the source endpoint of the first downlink flow may become aware of the congestion due to a failure to receive acknowledgement packets for the dropped data packets. When accomplishing the notification by including a congestion indication into one or more data packets, the source endpoint of the first downlink flow may become aware of the congestion due to receiving acknowledgement packets which reflect the congestion indication. The source endpoint of the first downlink flow may react to the congestion by reducing the sending rate of the first downlink flow.

According to a second scenario, a congestion on the bearer transmitting the first downlink flow occurs in the transport network 360. This is detected by the congestion detector 387 in the radio access node 380, e.g. on the basis of a data packet of the first downlink flow being marked with a congestion indicator, e.g. an ECN flag.

The congestion detector 387 indicates the detected congestion to the bearer selector 388 in the radio access node 380. In response to the detected congestion being in the transport network 360, the bearer selector 388 selects one or more of the bearers, e.g. the bearer transmitting the second downlink flow, for notification of the detected congestion and indicates the selected bearer to the congestion notifier 389. This selection is based on priorities of the bearers, e.g. absolute bearer priorities or priorities based on relative bitrates of the bearers. Assuming that the bearer transmitting the second uplink flow was determined to have the lower priority, e.g. due to exceeding its desired relative bitrate, this bearer is selected.

The congestion notifier 389 notifies the congestion in the downlink flow associated with the selected bearer. As mentioned above, this may be the bearer transmitting the second downlink flow. Depending on the implementation of the end-to-end protocol, this may be accomplished by dropping one or more data packets of the second downlink flow and/or by including a congestion indication, e.g. by setting an ECN flag, into one or more data packets of the second downlink flow. When accomplishing the notification by dropping one or more data packets, the source endpoint of the second downlink flow may become aware of the congestion due to a failure to receive acknowledgement packets for the dropped data packets. When accomplishing the notification by including a congestion indication into one or more data packets, the source endpoint of the second downlink flow may become aware of the congestion due to receiving acknowledgement packets which reflect the congestion indication. The source endpoint of the second downlink flow may react to the congestion by reducing the sending rate of the first downlink flow. This at the same time makes additional resources available for transmitting the data packets of the first downlink flow.

Now, handling of uplink flows in the implementation of FIG. 4 will be further explained by referring to exemplary scenarios involving two uplink flows, referred to as first uplink flow and second uplink flow. When referring to the implementation of FIG. 4, the first uplink flow could extend from the UE 210 to the end device 110, and the second uplink flow could extend from the UE 220 to the end device 120. However, it is to be understood that this is merely an illustrative example and that the first uplink flow and the second uplink flow could be any types of uplink flows, which are co-transmitted from the radio access node 380 to the control node 340 via the transport network 360. It is further assumed that the first uplink flow has a higher priority than the second uplink flow. For example, as mentioned above, the first and second uplink flows may relate to different services, and the service of the first uplink flow may have a higher priority than the service of the second uplink flow. Further, the first and second uplink flows may relate to different users and the user of the first uplink flow may have a higher priority than the user of the second uplink flow, e.g. due to the user of the first uplink flow having a premium contract. The priority information may be preconfigured in the control node 340 or may be configured by an operator, e.g. using an operations and maintenance (O&M) interface of the control node 340. The first and the second uplink flow are assigned to different bearers, one established between the control node 340 and the UE 210, and the other established between the control node 340 and the UE 220.

According to a first scenario, a congestion on the bearer transmitting the first uplink flow occurs on the radio link 260. This is detected by the congestion detector 386 in the radio access node 380, e.g. on the basis a data packet of the first uplink flow not being successfully received in the radio access node 380 or on the basis of a failure of the radio access node 380 to schedule the uplink transmission of one or more data packets of the first uplink flow. The congestion detector 386 indicates the detected congestion to the bearer selector 388. In response to the detected congestion being on the radio link 260, the bearer selector 388 selects the same bearer on which the congestion was detected, i.e. the bearer transmitting the first uplink flow, for notification of the detected congestion and indicates the selected bearer to the congestion notifier 389.

The congestion notifier 389 notifies congestion in the uplink flow associated with the selected bearer, i.e. in the first uplink flow. Depending on the implementation of the end-to-end protocol, this may be accomplished by dropping one or more data packets of the first uplink flow and/or by including a congestion indication, e.g. an ECN, into one or more data packets of the first uplink flow. When accomplishing the notification by dropping one or more data packets, the source endpoint of the first uplink flow may become aware of the congestion due to a failure to receive acknowledgement packets for the dropped data packets. When accomplishing the notification by including a congestion indication into one or more data packets, the source endpoint of the first uplink flow may become aware of the congestion due to receiving acknowledgement packets which reflect the congestion indication. The source endpoint of the first uplink flow may react to the congestion by reducing the sending rate of the first uplink flow.

According to a second scenario, a congestion on the bearer transmitting the first uplink flow occurs in the transport network 360. This is detected by the congestion detector 348 in the control node 340, e.g. on the basis of a data packet of the first uplink flow as received from the transport network 360 being marked with a congestion indicator, e.g. an ECN flag. The congestion detector 348 indicates the detected congestion to the bearer selector 347. In response to the detected congestion being in the transport network 360, the bearer selector 347 selects at least one of the bearers transmitting the first and second uplink flows, e.g. the bearer transmitting the second uplink flow, for notification of the detected congestion and indicates the selected bearer or bearers to the congestion notifier 346. This selection is based on priorities of the bearers. Assuming that the bearer transmitting the second uplink flow was determined to have the lower priority, e.g. due to exceeding its desired relative bitrate, this bearer is selected.

The congestion notifier 346 notifies the congestion in the uplink flow associated with the selected bearer. As mentioned above, this may be the bearer transmitting the second uplink flow. Depending on the implementation of the end-to-end protocol, this may be accomplished by dropping one or more data packets of the second uplink flow and/or by including a congestion indication, e.g. an ECN, into one or more data packets of the second uplink flow. When accomplishing the notification by dropping one or more data packets, the source endpoint of the second uplink flow may become aware of the congestion due to a failure to receive acknowledgement packets for the dropped data packets. When accomplishing the notification by including a congestion indication into one or more data packets, the source endpoint of the second uplink flow may become aware of the congestion due to receiving acknowledgement packets which reflect the congestion indication. The source endpoint of the second uplink flow may react to the congestion by reducing the sending rate of the second flow. In the transport network, this at the same time makes additional resources available for transmitting data packets of the first uplink flow.

According to the concepts as described above, the control node 340 and/or the radio access node 380 may operate with a fixed sending rate, e.g. the maximum possible sending rate. Complex flow control processes for adjusting the sending rates in these nodes are thus avoided. Rather, a flow control reaction may be initiated in the source endpoint of the end-to-end protocol in order to achieve the desired throughput or relative bit rates on all flows.

Figure 5:
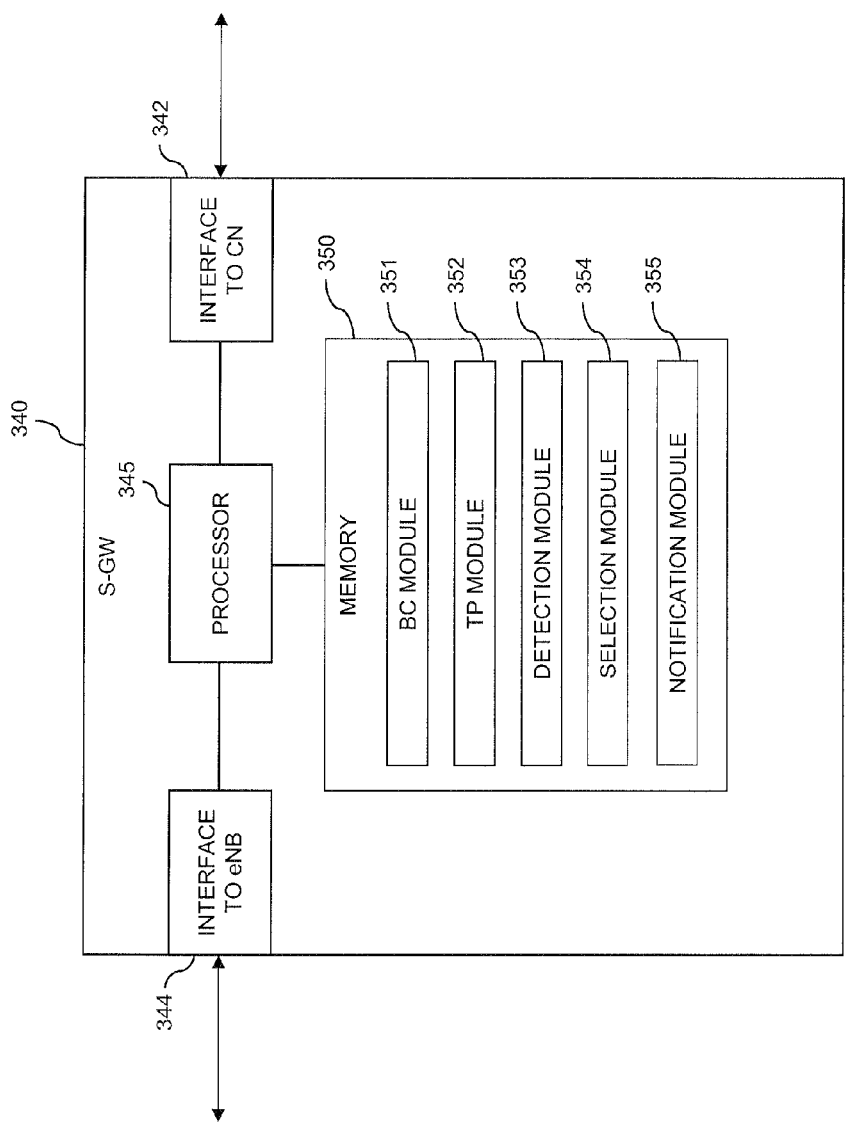
FIG. 5 schematically illustrates a network component according to an embodiment of the invention, which may be used as an intermediate node in the mobile communication network environment of FIG. 4.

FIG. 5 further illustrates an exemplary implementation of the control node 340. As explained above, the control node 340 is implemented as an S-GW to be used in a UTRAN according to the 3GPP technical specifications.

The control node 340 includes a core network (CN) interface 342, which may be implemented as a S5/S8 interface according to the 3GPP technical specifications, and a radio access node interface 342, which has the purpose of coupling the control node 340 via the transport network 360 to the radio access node 380, i.e. eNodeB. The core network interface 342 may also be used to implement the O&M interface of the control node 340. Further, the control node 340 includes a processor 345 coupled to the interfaces 342, 344 and a memory 350 coupled to the processor 345. The memory 350 may include a read-only memory (ROM), e.g. a flash ROM, a random-access memory (RAM), e.g. a Dynamic RAM (DRAM) or static RAM (SRAM), a mass storage, e.g. a hard disk or solid state disk, or the like. The memory 350 includes suitably configured program code to be executed by the processor 345 so as to implement the functionalities of the control node 340 as explained in connection with FIG. 4. More specifically, the memory 350 may include bearer control (BC) module 351 so as to implement bearer control functionalities, e.g. establishing, modifying or dropping of bearers, a transport protocol (TP) module 352 so as to implement functionalities of a transport protocol used for communication via the transport network 360, a detection module 353 so as to accomplish functionalities of the congestion detector 348, a selection module 354 so as to implement functionalities of the bearer selector 347, and a notification module 355 so as to implement functionalities of the congestion notifier 346. The memory 350 may also be used to implement the queues 341 as illustrated in FIG. 4.

It is to be understood that the structure as illustrated in FIG. 5 is merely schematic and that the control node 340 may actually include further components which, for the sake of clarity, have not been illustrated, e.g. physical link layer interface structures. Also, it is to be understood that the memory 350 may include further types of program code modules, which have not been illustrated, e.g. program code modules for implementing known functionalities of an S-GW in a E-UTRAN according to the 3GPP technical specifications.

Figure 6:
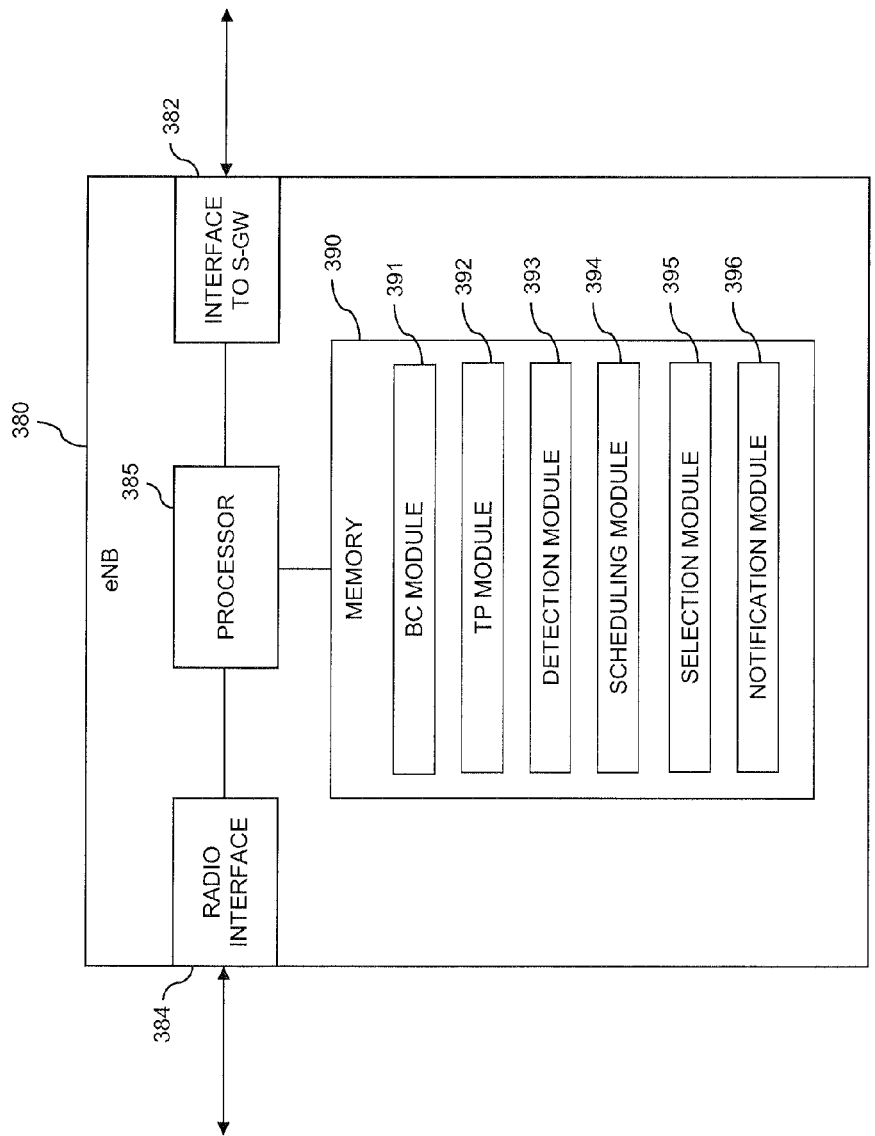
FIG. 6 schematically illustrates a further network component according to an embodiment of the invention, which may be used as a radio access node in the mobile communication network environment of FIG. 4.

FIG. 6 further illustrates an exemplary implementation of the radio access node 380. As explained above, the radio access node 380 is implemented as a eNodeB to be used in a E-UTRAN according to the 3GPP technical specifications.

The radio access node 380 includes a control node interface 382, which has the purpose of coupling the radio access node 380 via the transport network 360 to the control node 340, i.e. S-GW, which may be implemented as the S1 interface according to the 3GPP technical specifications, and a radio interface 384, for coupling to one or more UEs via the radio link 260. In the illustrated example of a eNodeB in a E-UTRAN according to the 3GPP technical specifications, the radio interface may be the Uu interface. Further, the radio access node 380 includes a processor 385 coupled to the interfaces 382, 384 and a memory 390 coupled to the processor 385. The memory 350 may include a read-only memory (ROM), e.g. a flash ROM, a random-access memory (RAM), e.g. a Dynamic RAM (DRAM) or static RAM (SRAM), a mass storage, e.g. a hard disk or solid state disk, or the like. The memory 390 includes suitably configured program code to be executed by the processor 385 so as to implement the functionalities of the radio access node 380 as explained in connection with FIG. 4. More specifically, the memory 390 may include a bearer control (BC) module 391 so as to implement bearer control functionalities, e.g. establishing, modifying or dropping of bearers, transport protocol (TP) module 392 so as to implement functionalities of the transport protocol used for communication via the transport network 360, a detection module 393 so as to accomplish functionalities of the congestion detector 386 and the congestion detector 387, a scheduling module 394 so as to accomplish scheduling of downlink and uplink transmissions of a UE served by the radio access node 380, a selection module 395 so as to implement functionalities of the bearer selector 388, and a notification module 396 so as to implement functionalities of the congestion notifier 389. A part of the memory 390 may also be used to implement the queues 381 as illustrated in FIG. 4.

It is to be understood that the structure as illustrated in FIG. 6 is merely schematic and that the control node 380 may actually include further components which, for the sake of clarity, have not been illustrated, e.g. physical link layer interface structures. Also, it is to be understood that the memory 390 may include further types of program code modules, which have not been illustrated, e.g. program code modules for implementing known functionalities of an eNodeB in a E-UTRAN according to the 3GPP technical specifications.

Figure 7:
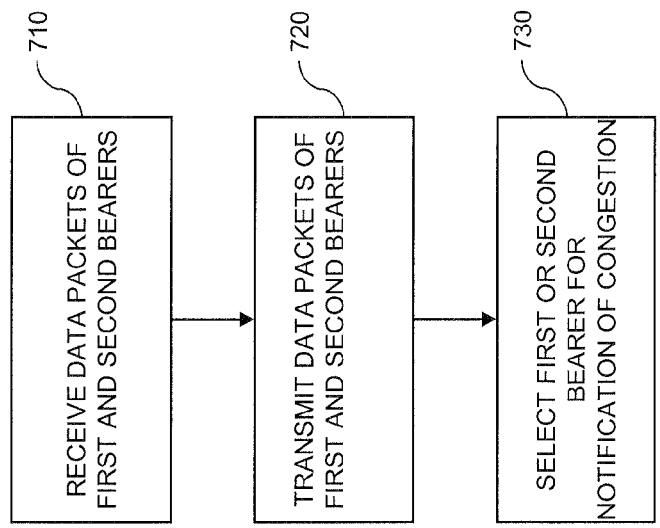
FIG. 7 shows a flowchart illustrating a method of congestion handling according to an embodiment of the invention.

FIG. 7 shows a flowchart illustrating a method according to an embodiment of the invention. The method may be used for congestion handling in the above-described control nodes 140, 340 or radio access nodes 180, 380.

At step 710, data packets of a flow associated with a first bearer and data packets of a flow associated with a second bearer are received in an intermediate node, e.g. the control node 140, the radio access node 180, the control node 340, or the radio access node 380. For this purpose, a corresponding interface of the control node may be used, e.g. one of the interfaces 142, 144, 182, 184, 342, 344, 382, 384 as described in connection with FIG. 2, 3, 5 or 6.

At step 720, the data packets of the first and second flows are transmitted from the intermediate node. For this purpose, a corresponding interface of the control node may be used, e.g. one of the interfaces 142, 144, 182, 184, 342, 344, 382, 384 as described in connection with FIG. 2, 3, 5 or 6.

At step 730, in response to a congestion being detected on the first bearer, at least one of the first bearer and/or the second bearer is selected for notification of the detected congestion in the associated flow. This may be accomplished by the bearer selector 188, 147, 388 or 347. The detected congestion may then be notified in the associated flow of the at least one selected bearer, e.g. by dropping at least one data packet of the associated flow and/or by including a congestion indication into at least one data packet of the associated flow.

In some embodiments, the first bearer and the second bearer may extend via a transport link and/or a radio link. In such embodiments, the selection of the bearer may depend on the type of the detected congestion, e.g. the detected congestion being on the radio link or in the transport network. Further, in some embodiments priorities of the bearers may be determined, and the selection may depend on the determined bearer priorities.

Figure 8:
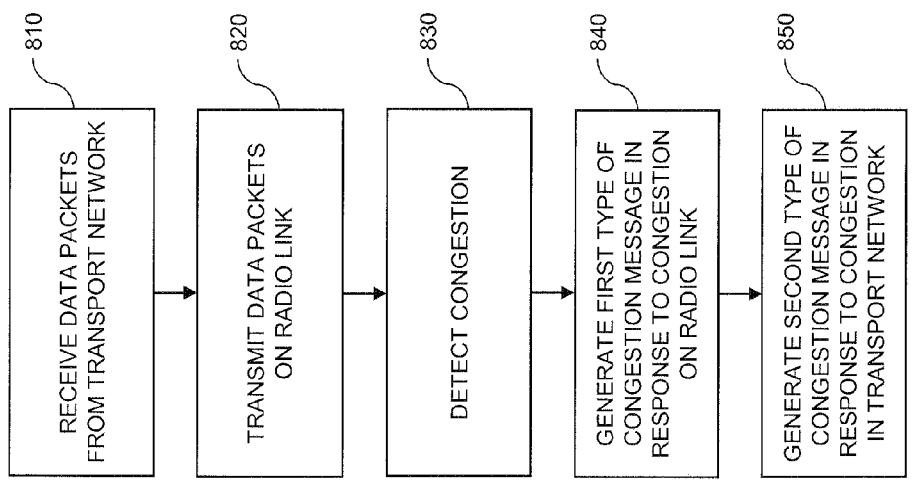
FIG. 8 shows a flowchart illustrating a further method of congestion handling according to an embodiment of the invention.

FIG. 8 shows a flowchart illustrating a further method according to an embodiment of the invention. The method may be used in the downlink implementation of FIG. 1B for detecting and reporting congestions by the radio access node 180.

At step 810, data packets are received from a transport network, e.g. the transport network 160 as explained in connection with FIG. 1B. In particular, the data packets may be received in a radio access node, e.g. the radio access node 180 as explained in connection with FIGS. 1B and 3. For this purpose, a corresponding interface of the radio access node may be used, e.g. the interface 182 as explained in connection with FIG. 3.

At step 820, the data packets of the first flow and the data packets of the second flow are transmitted on a radio link, e.g. the radio link 250 as explained in connection with FIG. 1B.

At step 830, a congestion on the radio link or in the transport network is detected. This may be accomplished by the congestion detectors 186 and 187 as explained in connection with FIG. 1B. Detecting the congestion being on the radio link may involve detecting the congestion on the basis of a queuing parameter, e.g. a fill level and/or a queuing delay, of a queue to which the data packets are assigned in the radio access node before being transmitted on the radio link. Detecting the congestion in the transport network may involve detecting at least one data packet which was not successfully received from the transport network or detecting a packet which was marked with a congestion indicator in the transport network.

At step 840, a first type of congestion message is generated in response to the detected congestion being on the radio link, e.g. message A as explained in connection with FIG. 1B.

At step 850, a second type of congestion message is generated in response to a congestion in the transport network, e.g. message B as explained in connection with FIG. 1B.

The first and second types of congestion messages may then be transmitted to another node, e.g. the intermediate node in the method of FIG. 7, so as to accomplish bearer selection in response to different types of detected congestion.

Accordingly, in some embodiments the concepts as described herein involve that a congestion is detected in one node, i.e. in the radio access node 180, but a response to the congestion is caused in another node, e.g. the control node 140. This may be beneficial since the other node may have access to other protocol levels than the node actually detecting the congestion. For example, it may become possible to distinguish between different flows of an end-to-end protocol. Further, in some embodiments, a congestion detected with respect to one flow or bearer produces a flow control reaction, e.g. congestion notification or dropping of a packet, with respect to another flow or bearer. This may be beneficial, e.g., if one flow or bearer is related to a service or user having a higher priority than the other. Further, in some embodiments different types of congestion messages are used to report a congestion on a radio link and a congestion in a transport network. A remote flow control reaction may thus be adapted to the type of detected congestion.

It is to be understood that the examples and embodiments as explained above are merely illustrative and susceptible to various modifications. For example, the concepts could be used in other types of network environment, including wired communication networks, or using different types of protocols. Moreover, it is to be understood that the concepts as described herein for downlink flows and uplink flows may be used together in a single network, or may be used separately. Moreover, the HSPA implementations of FIGS. 1A, 1B, 1C, 2 and 3 may be combined with the LTE implementation of FIG. 4 in the same mobile communication network. In such embodiments, the same transport network may be shared for providing a connection between the RNC and the NodeB, and for providing a connection between the S-GW and the eNodeB. Further, it is to be understood that the representation of the queues in FIGS. 1A, 1B, 1C, and 4 is merely schematic. For example, there may be separate queues for the uplink and downlink directions in each of the described nodes. Depending on the flow direction in which the congestions to be handled occur, the concepts as described herein may be applied to one of such queues, either the uplink queue or the downlink queue.

The invention claimed is:

1. A method of handling congestion in a communication network, the method comprising:

receiving, in an intermediate node, Internet Protocol data packets of a first flow between a first source endpoint and a first destination endpoint, the first source endpoint defined by a source address and a source port of the Internet Protocol data packets of the first flow, the first destination endpoint defined by a destination address and a destination port of the Internet Protocol data packets of the first flow, the first flow being transmitted via an associated first bearer;

receiving, in the intermediate node, Internet Protocol data packets of a second flow between a second source endpoint and a second destination endpoint, the second source endpoint defined by a source address and a source port of the Internet Protocol data packets of the second flow, the second destination endpoint defined by a destination address and a destination port of the Internet Protocol data packets of the second flow, the second flow being transmitted via an associated second bearer;

transmitting, from the intermediate node, the Internet Protocol data packets of the first flow associated with the first bearer and the Internet Protocol data packets of the second flow associated with the second bearer;

in response to a congestion being detected on the first bearer, selecting at least one of the first bearer and the second bearer for notification of the congestion in the associated flow; and notifying, by the intermediate node, the detected congestion by dropping at least one Internet Protocol data packet of the flow associated with the selected one of the first bearer and the second bearer or by marking at least one Internet Protocol data packet of the flow associated with the selected one of the first bearer and the second bearer.

2. The method of claim 1, wherein the selecting at least one of the first bearer and the second bearer comprises selecting at least one of the first bearer and the second bearer dependent on a type of the detected congestion.

3. The method of claim 2, further comprising receiving, in the intermediate node, a congestion message indicating the type of the detected congestion.

4. The method of claim 1, further comprising receiving, in the intermediate node, a congestion message indicating the selected one of the first bearer and the second bearer.

5. The method of claim 1, wherein the first bearer and the second bearer extend via a transport network, and wherein the method further comprises:
   determining a priority of the first bearer and the second bearer; and
   in response to the detected congestion being in the transport network, selecting at least one of the first bearer and the second bearer according to the determined priorities.

6. The method of claim 5, wherein determining the priority of the first bearer and the second bearer comprises determining the priority of the first bearer and the second bearer based on a relative bitrate of the first bearer and a relative bitrate of the second bearer.

7. The method of claim 5, further comprising detecting the congestion being in the transport network by detecting at least one data packet of the first flow associated with the first bearer, wherein the at least one data packet of the first flow was not successfully received from the transport network.

8. The method of claim 5, further comprising detecting the congestion being in the transport network by detecting at least one data packet of the first flow associated with the first bearer, wherein the at least one data packet of the first flow associated with the first bearer is marked with a congestion indicator in the transport network.

9. The method of claim 1:
   wherein the first bearer and the second bearer extend via a radio link; and
   wherein, in response to the detected congestion being on the radio link, selecting at least one of the first bearer and the second bearer comprises selecting the first bearer for notification of the congestion in the associated flow.

10. The method of claim 9, further comprising detecting the congestion being on the radio link by monitoring at least one queuing parameter of a queue storing the data packets of the first flow associated with the first bearer, wherein the data packets of the first flow are to be transmitted on the radio link.

11. The method of claim 10, wherein the at least one queuing parameter comprises a fill level of the queue or a queuing delay of the queue.

12. A network component, comprising:
   a first interface configured to:
      receive Internet Protocol data packets of a first flow between a first source endpoint and a first destination endpoint, the first source endpoint defined by a source address and a source port of the Internet Protocol data packets of the first flow, and the first destination endpoint defined by a destination address and a destination port of the Internet Protocol data packets of the first flow, the first flow being transmitted via an associated first bearer;
      receive Internet Protocol data packets of a second flow between a second source endpoint and a second destination endpoint, the second source endpoint defined by a source address and a source port of the Internet Protocol data packets of the second flow, and the second destination endpoint defined by a destination address and a destination port of the Internet Protocol data packets of the second flow, the second flow being transmitted via an associated second bearer;
   a second interface configured to transmit the Internet Protocol data packets of the first flow associated with the first bearer and the Internet Protocol data packets of the second flow associated with the second bearer;
   a bearer selector configured to select, in response to a congestion being detected on the first bearer, at least one of the first bearer and the second bearer for notification of the congestion in the associated flow; and
   a congestion notifier configured to notify the congestion by dropping at least one Internet Protocol data packet of the flow associated with the selected one of the first bearer and the second bearer or by marking at least one Internet Protocol data packet of the flow associated with the selected one of the first bearer and the second bearer.

13. The network component of claim 12, wherein the bearer selector selects at least one of the first and second bearers dependent on a type of the detected congestion.

14. The network component of claim 12, wherein the first bearer and the second bearer extend via a transport network, and wherein the bearer selector selects at least one of the first and second bearers by:
   determining a priority of the first bearer and the second bearer; and
   in response to the detected congestion being in the transport network, selecting at least one of the first bearer and the second bearer according to the determined priorities.

15. The network component of claim 12, wherein the first bearer and the second bearer extend via a radio link, and wherein the bearer selector selects at least one of the first and second bearers by selecting the first bearer for notification of the congestion in the associated flow in response to the detected congestion being on the radio link.

16. The network component of claim 15, further comprising a congestion detector configured to detect the congestion being on the radio link by monitoring at least one queuing parameter of a queue storing the data packets of the first flow associated with the first bearer, wherein the data packets of the first flow are to be transmitted on the radio link.

17. The network component of claim 16, wherein the at least one queuing parameter comprises a fill level of the queue or a queuing delay of the queue.

* * * * *